(12) United States Patent
Katz et al.

(10) Patent No.: US 6,424,706 B1
(45) Date of Patent: Jul. 23, 2002

(54) METHOD AND SYSTEM FOR TRANSFERRING TELECOMMUNICATION-TIME UNITS AMONG ACCOUNTS AND EXCHANGING SAME FOR GOODS OR SERVICES

(75) Inventors: Howard B. Katz, Coconut Drive, FL (US); Daniel E. Boerner, Seattle, WA (US)

(73) Assignee: Imagine Networks, LLC, New York, NY (US)

( * ) Notice: Subject to any disclaimer, the term of this patent is extended or adjusted under 35 U.S.C. 154(b) by 0 days.

(21) Appl. No.: 09/282,972

(22) Filed: Mar. 31, 1999

(51) Int. Cl.⁷ .............................................. H04M 17/00
(52) U.S. Cl. ........................ 379/144.01; 379/112.01; 379/114.01; 379/114.15; 379/114.17; 379/114.2
(58) Field of Search ........................... 379/111–115.03, 379/121, 126, 144–145, 154, 143, 91.01, 121.01–121.06, 144.01

(56) References Cited

U.S. PATENT DOCUMENTS

| | | | |
|---|---|---|---|
| 4,706,275 A | | 11/1987 | Kamil |
| 4,879,744 A | | 11/1989 | Tasaki et al. |
| 4,975,942 A | | 12/1990 | Zebryk |
| 5,138,650 A | | 8/1992 | Stahl et al. |
| 5,577,109 A | | 11/1996 | Stimson et al. |
| 5,621,787 A | * | 4/1997 | McKoy et al. ............... 379/144 |
| 5,721,768 A | * | 2/1998 | Stimson et al. ............. 379/114 |
| 5,762,376 A | | 6/1998 | Taskett |
| 6,081,791 A | * | 6/2000 | Clark |
| 6,115,458 A | * | 9/2000 | Taskett |
| 6,122,355 A | * | 9/2000 | Strohl |

* cited by examiner

Primary Examiner—Duc Nguyen
(74) Attorney, Agent, or Firm—Kramer Levin Naftalis & Frankel LLP

(57) ABSTRACT

A system and method for accessing the value associated with a pre-purchased amount of telecommunication-time for making telephone calls and for uses other than making telephone calls is provided. The system includes a computer system including a prepaid platform adapter for interfacing with a prepaid platform, and a financial network adapter for interfacing with a financial network. Unit minutes, having a value associated with the purchased amount of telecommunication-time, are convertible to telecommunication-time equivalents for making telephone calls and monetary equivalents for uses other than making telephone calls. A database, communicating with the computer, includes subscriber account information and transaction processing protocol information for each adapter. A remote input server, communicating with the computer, provides an input device to access the computer. The input device allows the subscriber to purchase the unit minutes, transfer the unit minutes to others (including non-subscribers) and redeem the unit minutes, and to use the unit minutes to purchase telephone minutes and redeem for goods and services.

30 Claims, 12 Drawing Sheets

METHOD AND SYSTEM FOR TRANSFERRING TELECOMMUNICATION-TIME UNITS AMONG ACCOUNTS AND EXCHANGING SAME FOR GOODS OR SERVICES

BACKGROUND OF THE INVENTION

The present invention relates generally to a method and system for purchasing, storing, exchanging, converting, transferring, and other advantageous uses of, stored value accounts, for example, accounts of frequent-flyer miles, shopping-stamp premiums, prepaid transportation tickets or badges (such as Transit Pass or EZ Pass) and long distance or other telephone card minutes. For ease in explanation, and with respect to a preferred system and method of the invention, reference will be made to an embodiment of the invention utilizing long distance or other telephone card minutes. Thus, for example, the present invention, in this embodiment, relates generally to a method and system for purchasing, storing, exchanging, converting, transferring, and other advantageous uses of, prepaid telecommunication-time units over a network, wherein the telecommunication-time has a value associated with the cost of local and long-distance telephone call minutes.

Prepaid telecommunications systems are well known in the art. Such systems allow customers to pre-purchase telecommunication-time for use later in placing telephone calls using normal telephones, payphones and more recently wireless telephone, and have proved commercially successful and desirable for several reasons. Prepaid customers avoid collect and operator assistance surcharges, and they can obtain long distance calling service without credit and without payment of monthly bills. Furthermore, telecommunication service operators prefer such systems because of the lack of bad-credit concerns since the cost of the call has been pre-paid by the caller. Up to now, prepaid telecommunications systems address the telecommunication needs of such subscribers and telecommunication service operators, but do not enable any other use for the prepaid telecommunication-time other than for placing telephone calls.

Furthermore, a large percentage of the customers preferring prepaid telecommunications services are lower income individuals who either do not qualify for traditional bank accounts or find them inconvenient and expensive because of minimum balance requirements, overdrawn account problems, poor customer service and long lines at pay day. Instead such customers prefer to perform traditional banking transactions and other financial services, such as check cashing, at special purpose check-cashing agencies which typically charge large fees in comparison with traditional banks.

In addition, many prepaid telecommunication customers often may perform frequent national and international money transfers. In such cases, the customer faces the inconvenience 10 of travelling to a local branch of a money transfer service, waiting for the transfer to be completed, and incurring the added expense of 20–30% transaction fees and unfavorable exchange rates.

Furthermore, many of these same individuals may be unable to qualify for a credit card, and are therefore unable to access the important commerce opportunities available on the Internet and through telephone-based catalog or mail ordering. Increasingly, goods and services are available at a discounted price, if not exclusively, when purchased at Internet websites via a credit card or in specialized telephone or mail-order catalogs. Individuals unable to access such commerce opportunities are at a significant financial disadvantage.

As aforementioned, systems that allow for the prepayment of telephone calls are generally well known in the art. For example a variety of prepayment telephone systems are disclosed in U.S. Pat. Nos. 4,706,275 to Kamil; 4,879,7444 to Tasaki, et al.; and 4,975,942 to Zebryk. A typical prior art system may be illustrated in Prior Art FIG. 1A. A subscriber 100 pays money at a step 101 to a vendor and purchases and activates a fixed amount of telecommunication-time or minutes at a step 102. Subscriber 100 will receive some validation and code information related to the pre-purchased minutes, typically by way of a prepaid calling card. These cards may also be purchased at vending machines or any variety of retail locations and may even be given away as a premium or bonus to a qualifying subscriber. Each card typically has a fixed price and is redeemable for a fixed amount of telecommunication-time, however, some systems let subscriber 100 purchase additional minutes. Redeeming these cards typically involves calling a toll-free telephone number to activate the minutes. First, subscriber 100 inputs their unique subscriber ID, which in the case of long distance prepaid systems is typically a temporary identifier, printed on the card itself and good until all of the minutes associated with the card are used up. In the case of a prepaid wireless system, the subscriber ID is typically a permanently assigned number and may be the unique ESN identifier associated with the wireless telephone handset itself, in which case subscriber 100 may not need to input the number if they are activating the calling card from their wireless telephone. Next, subscriber 100 inputs a unique card number printed on the card. The prepaid system authenticates this number and subsequently credits subscriber 100 with the appropriate number of minutes and deactivates the unique card number to avoid duplicate use. In cases where the cards have not been pre-purchased by the retail vendor, the company providing the prepaid telephone service later bills the vendor for the cost of the minutes provided, which the vendor collects, plus any profit margin, from the sale of the cards to subscriber 100.

Purchased and activated minutes are added at a step 103 to a prepaid minute account 108 associated with subscriber 100. Subscriber 100 can then place a telephone call 104 to a non-subscriber 106 (or any other individual) either by calling a toll-free number and entering a subscriber ID, or in the case of wireless prepaid systems, by using their uniquely identified wireless telephone handset. The duration of the call in minutes is measured in a step 105 and the result is subtracted from subscriber minute account 108 in a step 107.

While such prior art systems facilitate prepayment of telephone calls, they nevertheless do not allow advantageous use of prepaid telecommunication-time for uses other than making telephone calls. The openMEDIA prepaid telephone system created by Open Development Corporation, a subsidiary of Glenayre Technologies Inc. allows for a limited transfer of prepaid minutes between multiple accounts, but is restricted to those accounts assigned to the same subscriber. The openMEDIA system also does not allow subscribers to transfer minutes between subscribers, nor does it offer any services at all to non-subscribers, and thus does not satisfy many of the needs provided by the invention as described herein.

Typical prior art money transfer systems, such as those operated by Western Union and MoneyGram, are illustrated in Prior Art FIG. 1B. As shown, a sender 109 typically visits a local branch office 111 and fills out a form with the transfer amount and information about the recipient 116. Next, sender 109 makes a payment at a step 110 for the amount to be transferred, a transaction fee and additional exchange fees for international transfers to local branch office 111 and typically receives a receipt with a special transaction identifier at a step 112 and/or assigns a special test question for the recipient to answer. Sender 109 can then place a telephone call at a step 117 to receiver 116 to inform them of the special transaction identifier. In a step 113, local branch office 111 then electronically transfers the money to a remote branch office 115 closest to recipient 116. After some period of time, ranging anywhere between several minutes to several days, recipient 116 visits their local branch office (remote branch office 115), presents the transaction identifier and/or answer to test question and picks up the transferred money at a step 114. The high cost of the transaction, often 10 to 30 percent of the money transferred, plus currency exchange fees of these services, is one major disadvantage of such prior art systems. Another disadvantage is that, except in the case where the sender uses a credit card to send money via a telephone, each transfer typically requires both the sender and receiver to visit a branch office. This approach means that customers often must wait in lines both to send and receive money and that more branch office employees are needed, thus increasing the cost of providing the service.

Conventional banks also may offer electronic funds transfers to their customers. These systems allow customers to transfers funds to and from their checking accounts using the national Automated Clearing House (ACH) network. As illustrated in Prior Art FIG. 1C, an account holder 120 can send a payment instruction at a step 127 to a company 123 to instruct company 123 to either automatically deposit payroll checks at a step 124 into their checking account at a bank 105 (direct deposit), or have company 123 send a payment request at a step 126 to bank 105, requesting an automatic withdrawal of funds to pay a bill at a step 125 (electronic bill pay). Additionally, account holder 120 can arrange for money to be wired to and from their checking account at bank 105 by giving instructions to bank 105 at a step 121 as long as they have the appropriate checking account and bank routing numbers for both parties' accounts. Although such systems, especially direct deposit and electronic bill pay, are becoming increasingly popular they are only available to holders of checking accounts and thus do not address the large and growing number of individuals who may not have bank accounts.

Conventional banks do however, have large numbers of checking and savings deposit accounts, which in actuality are already "pre-paid" accounts. Unfortunately, those bank customers that may appreciate the advantages that prepaid telecommunication service offer, such as fixed telecommunication costs and only paying for actual time used, must manage independent accounts with their telecommunication and banking service providers. These customers, having access to only prior art financial and telecommunication systems, suffer the disadvantage of being unable to instantly and conveniently interchange prepaid deposits and prepaid telecommunication time.

Prior art systems have recently appeared that enable customers to acquire prepaid debit cards, that once "loaded" with money, allow their users access to Internet e-commerce, telephone-based catalog and mail order commerce, and other credit-based commercial activities. However, these systems require the creation of a new distribution network to issue and receive prepayment for the prepaid cards. Similarly, prior art prepaid debit card systems require customers who also use prepaid telephone cards to manage multiple prepaid cards and multiple prepaid account balances leading to inconvenience and customer frustration. Customers may appreciate a system that allows a single prepaid account to be used for both telecommunication purposes and general commerce.

Conventional banks are currently exploring the use of stored value cards, known as Smart Cards, as a means of addressing the financial needs of lower income customers as well as the general population who may find them more convenient to carry than cash. Since these cards are preloaded with an amount of money by the customer for use at stores or payphones, they address some of the same bad-debt issues as prepaid calling cards. However, these smart cards are based on new and expensive technology and though successful in Europe, early trials in New York City have proven unsuccessful. Even if such systems prove popular in the future, the cost of widely deploying new terminals will be significant and will take many years to reach the current ubiquity of the present day telephone and ATM networks.

Thus, prior art prepaid telecommunications systems do not provide the financial services such as money transfer and prepaid minute redeeming desired by their customers; and prior art financial service systems, such as checking accounts, money transfer systems, smart cards and newer prepaid debit cards, do not provide the combination of ubiquitous access devices, such as telephones, with the convenience of a single prepaid account that can be used to acquire any good or service.

There is therefore, still a great need for a system that enables telecommunication companies to provide financial services to their customers while simultaneously enabling financial institutions to provide telecommunication services and telecommunication device access to their customers, neither of which is possible with systems of the prior art.

SUMMARY OF THE INVENTION

Generally speaking, in accordance with the present invention, a method and system for purchasing, storing, exchanging, converting, transferring, and otherwise advantageously using prepaid stored value accounts, such as telephone call minute accounts containing telecommunication-time units, over a network is provided. More specifically, and with reference to an embodiment of the present invention relating to a telephone call minute account, the method and system of the invention provides a subscriber account wherein telecommunication-time has a value associated with the cost of telephone call minutes and may be accessed by a wireless telephone, an ATM card or other access device. Even more specifically, the system and method allows its subscribers to access the value associated with any unused pre-paid telecommunication-time for uses other than placing telephone calls, such as for acquiring goods and services, and for transferring the associated value to others, especially such transfers to others overseas.

Unused telecommunication time has a market value, thus, pre-purchased telecommunication-time may be redeemed for goods and services also having a value. Therefore, the system and method of the invention provides a value added service to existing wireless telephone services, particularly pre-paid wireless services, and allow the subscriber to use their "minute account," for example, as a stored value account. The system and method also provides a value added service to existing financial institutions, particularly those managing customer deposits, and allows the customer to use their deposit account, for example, as a "minute account" for conveniently placing local and long-distance telephone calls. The system and method preferably allows a wireless telephone handset and an ATM card to be used by the subscriber to access their stored minute account and its associated stored value.

Furthermore, in a preferred embodiment, an automated telecommunication-time clearinghouse network is established. Membership in this network allows companies, such as prepaid telecommunication service providers (PSPs), telecommunication-time resellers and wholesalers and financial services institutions to provide their customers with the benefits of the present invention. The clearinghouse network facilitates the transfer and redemption of telecommunication-time between customers of each network member and furthermore provides a settlement process between network members in which all telecommunication-time trades between members are settled.

In practice, the system of the present invention allows its subscribers to perform a plurality of unit-minute-related transactions, which can be divided into three basic types, unit-minute purchase, unit-minute transfer and unit-minute redemption transactions. Before providing a summary of these transactions, it is useful to provide a summary of the notion of "unit-minutes," which forms an important aspect of such unit-minute related transactions.

It is a fact of today's market place that the cost to a telephone carrier of providing a traditional circuit-based telephone call depends generally upon the distance between the originating and receiving parties. Though newer flat-rate service offerings and packet-based telephony service offerings have recently appeared, the great majority of current telecommunication connections are still priced based upon the distance between caller and sender for the connection. Given this fact, it is obvious that systems that do differentiate between local, long distance and international calls may charge different rates for each call type. Furthermore, different companies may charge different rates for the same type of call. It then follows that a system, such as that of the present invention, based upon the notion of minutes as a purchasable, transferable and redeemable commodity must provide a means of converting and equating different minute types and company costs. The system of present invention addresses this need by employing the notion of "unit-minutes", wherein unit-minutes are priced in the local currency of the country where the customer acquires the service and are generally related to the price of other minute types, such as local, long distance and international minutes within the same, and among different companies by a "unit-minute to telecommunication minute" conversion factor. Thus, the exchange quantum of the present invention is termed the "unit-minute system" herein.

In the United States for example, a unit-minute may be valued by one company at any convenient fraction of a dollar, such as $0.10. Local, long distance and international "minutes" are then priced independently, based on telecommunication costs in that country. Dividing the price of a given country's telecommunication minutes by the price of that country's unit-minutes results in a "unit-minute to telecommunication-minute" conversion factor. For example, U.S. local, long distance and international minutes may, for one company, be priced at $0.20, $0.50 and $0.70 respectively. This equates to a unit-to-local conversion factor of 2, a unit-to-long distance conversion factor of 5, a unit-to-international conversion factor of 7. Therefore, a subscriber who purchases 50 dollars of long distance minutes at $0.50 a minute from Company A, would have purchased 50 divided by 0.5, or 100 long distance minutes, and would own 5 times that many, or 500, unit-minutes.

In France, however, unit-minutes are preferably valued in French local currency and thus may be valued at, for example, 0.1 Francs. Then, if local minutes are priced at 2 Francs, long distance at 4 Francs and international minutes at 6 Francs, a unit-to-local conversion factor of 20, a unit-to-long distance conversion factor of 40 and a unit-to-international conversion factor of 60 results. Therefore, a subscriber who purchases 60 francs of long distance minutes at 4 Francs a minute from Company B, would have purchased 60 divided by 4, or 15 long distance minutes, and would own 40 times that many, or 600, unit-minutes.

Since unit-minutes are always valued in terms of local currency, transactions that involve multiple currencies are generally handled using the following process. First, the unit-minute system calculates the monetary value, in the sending subscriber's currency, of the unit-minutes about to be transferred. Next, in conjunction with currency exchange rate tables, the system calculates the equivalent monetary value in the receiving subscriber's currency. Next, using unit-minute rate tables, associated with the receiver's prepaid service provider, the system calculates the number of unit-minutes that can be purchased with the calculated amount of receiver currency. During this process the system also calculates currency exchange fees which will be charged to the sending and/or receiving person.

As described herein, prior art prepaid telephone systems typically allow customers to pre-purchase minutes by purchasing prepaid calling cards. The integration of the unit-minute system of the invention with prior art prepaid systems does not require altering this method of pre-purchasing minutes.

Most prior art prepaid systems also allow customers to purchase minutes via major credit cards. This is typically performed via an interactive voice response (IVR) interface in which the subscriber inputs their credit card number over the telephone, inputs an amount of minutes to purchase and then purchases minutes. The integration of the unit-minute system of the invention with prior art prepaid systems does not require altering this method of pre-purchasing minutes.

As described herein, in some embodiments of the invention, the subscriber's unit-minute account is associated with a traditional bank account managed by a financial institution. This bank account may be a checking or savings account normally used by the subscriber or it may be a special bank account created specifically for the purpose of integration with the unit-minute system. In either case, an aspect of the present invention described herein integrates with the computer systems of the financial institution, to enable the bi-directional conversion between unit-minutes and their associated monetary value. In this fashion standard deposits made into such an associated bank account, such as direct payroll deposits, are automatically converted into unit-minutes, in effect, automatically purchasing telecommunication-time.

Check cashing companies may offer a similar service without establishing a bank account by combining their normal check cashing service with the selling of telecommunication-time. In this method, the proceeds normally remitted to the customer in cash would be used to purchase prepaid telecommunication-time, which would be added to the subscriber's unit-minute account. Such a purchase could be offered at a reduced cost compared to performing the two transactions independently.

In a preferred embodiment, the unit-minute method and system of the invention is integrated with a telecommunication-switch that enables subscribers to access their unit-minute account using any telephone. In this embodiment, unit-minute transfers between subscribers are performed by the sending subscriber calling a special telephone number associated with the telecommunication-switch and inputting the desired transaction, including the receiving subscriber's identifier (i.e., phone number) and the amount of unit-minutes to transfer. The unit-minute system then performs the transfer by subtracting the transferred unit-minutes plus any associated transaction fees, if any, from the sending subscriber's unit-minute account and adding the transferred unit-minutes less any associated transaction fees, if any, to the receiving subscriber's unit-minute account. The unit-minute system and an associated unit-minute automated clearinghouse network (UMACH) then handles the necessary unit-minute settlement process, including any issues which may arise from currency exchanges between members. In this case the sending subscriber's PSP would owe the receiving subscriber's PSP the monetary value associated with the transferred unit-minutes.

The system and method also allow subscribers to transfer unit-minutes to non-subscribers. In this method, sending subscribers transfer their unit-minutes to a redemption office account near the physical location of the non-subscriber where they are held pending the arrival of the non-subscriber. During the transfer process the unit-minute system assigns a special transaction identifier to the transaction and informs the sending subscriber of this identifier. This identifier can be thought of as a temporary subscriber identifier that is valid for only this transaction.

The sending subscriber then communicates this identifier to the non-subscriber who can then visit the redemption office, submit the identifier and then redeem the monetary value associated with transferred unit-minutes, in effect, surrendering the transferred unit-minutes to the redemption office.

Similarly, non-subscribers may be granted a temporary subscriber identifier to be used for transferring unit-minutes to subscribers or other non-subscribers. In this method, the non-subscriber is granted a temporary subscriber identifier at the time of unit-minute purchase and may then use that identifier either to activate the unit-minutes for their own use, or for purposes of transferring those unit-minutes to another party.

Although the previous examples have all focused on transactions involving individuals, the same method and system can be applied between commercial businesses. For example, a delivery business can use the service to receive value from a merchant for delivered goods.

Furthermore, although the previous examples have focused on transactions involving pre-paid minutes, the same method and system of the invention can be applied to credit-based transactions in the conventional manner. That is, the credit-granting entity assigns a maximum minute account amount (a credit limit) to the subscriber and the subscriber, when using the minutes, is extended those minutes on the terms of the credit agreement. Typically, this will involve re-paying the credit company, plus interest, for any minutes actually used on a monthly, or other revolving basis.

In a preferred embodiment, the system and method of the invention also provides a method for subscribers to access their "minute account" from any ATM or retail point-of-sale, POS terminal. In this method, the subscriber is issued a debit card associated with their prepaid minute account. This debit card is configured and functions in the same manner as traditional checking account based debit cards, except that in this case, withdrawals trigger a reduction of unit-minutes equivalent to the value of withdrawal. Integration between the system and POS/ATM networks requires that the system and its associated corporate owner become a member bank within the financial network. Membership typically entails meeting certain network guidelines concerning credit worthiness and financial liquidity. In addition such memberships usually entail that the member becomes a governmentally registered and regulated bank. In an embodiment where a non-financial network member implements the invention, it may be advantageous to partner with an existing financial network member. In this method of integration, the system's financial network interface would interface with the backend computer systems of the financial partner instead of directly with the financial networks.

The card may be used to make purchases at any merchant's POS terminal, to make cash withdrawals at an associated ATM terminal, to place orders over the telephone or via online websites. There are two basic methods for enabling this integration. In the first "manual" method, before redeeming unit-minutes via the debit card, subscribers must first transfer the unit-minutes to a redemption office account associated with a financial institution. The associated value of the transferred unit-minutes is then accessible via the debit card. In the second "automatic" method, the withdrawal process triggers a process of the present invention, which automatically transfers the number of unit-minutes equivalent to the withdrawal amount, plus any transaction fees imposed by the unit-minute system or financial network, if any, to the financial institution that issued the debit card, in effect selling the unit-minutes. Later, through the UMACH network settlement process, the financial institution sells these unit-minutes back to the network in order to recoup the money issued during the withdrawal.

Another method of unit-minute redemption involves redemption offices affiliated with the UMACH network. In this method, the subscriber transfers unit-minutes from their account to the account of the redemption office, receiving system generated transaction codes during the process. The subscriber then visits the redemption office with these transaction codes and is given the monetary value of the transferred unit-minutes, minus transaction fees if any. The subscriber may be charged a transaction fee for the redemption, which is shared with the redemption office. Later, through the UMACH network settlement process, the redemption office sells these unit-minutes back to the network in order to recoup the money issued during the redemption.

In a preferred embodiment, after unit-minute transactions are completed, the system notifies both parties of the success of the transaction, and provides a unique transaction identifier that can be used for future reference and validation. A plurality of notification options are employed by the system, including but not limited to, voice response prompts, automated voicemail messages, email messages, text messages received via a pager or telephone and fax messages. In addition, the sender may have the option of being directly connected to the receiver after the transfer, in order to inform the receiver personally of the transaction.

The system of the present invention enables the described unit-minute transactions and others by serving as a point of interconnection between telecommunication networks, including prepaid telecommunication platforms, financial networks, including ATM/POS terminals, electronic funds transfer networks, such as FedWire and CHIPS, and the Internet. In a preferred embodiment, the system is comprised of a computer system, a database, a remote input server, such as a telecommunications switch, communicating with a subscriber input device, such as a wireless telephone, and preferably a notification subsystem, all of which communicate as necessary over a plurality of public and private networks.

For instance, in a preferred embodiment, the present invention leverages existing prepaid minute accounts stored within a prepaid telephone platform, rather than replacing them with the invention's own minute accounts. Therefore, in order to perform the necessary unit-minute transactions, the unit-minute system must have read and write access to these accounts, and a converter for converting the existing prepaid minutes of the prepaid platform to the unit-minutes of the invention. Furthermore, any changes to data fields of the prepaid platform's minute account that are accessed by both the prepaid platform and unit-minute system must be made using a method that guarantees transactional integrity. Such access may be accomplished by integrating the transaction processing subsystem of the unit-minute system's computer system with the transaction processing subsystem of the prepaid platform by an adapter. Each system's transaction processing subsystem will in turn communicate with its respective database as needed to update any changed fields. Once the two systems are integrated in such a fashion, changes made by either system to such shared fields will be communicated to both systems in a transactionally safe and reliable fashion.

Since subscribers and/or redemption office employees may initiate and control many of these unit-minute transactions, the system provides an easy means of user control or user interface. Furthermore, the more ubiquitous and convenient such device access is, the more useful customers will find the service. For this reason, the system allows subscribers to use a variety of access devices and methods; including telecommunication devices, such as telephones, financial network access devices, such as debit cards and ATM cards, digital computing devices, such as handheld computers or personal digital assistants, and/or human customer service representatives either in person or by telephone. In a preferred embodiment, existing telecommunication access devices, such as wireless telephones, communicate with a traditional telecommunication switch of the unit-minute system to control the system. Typically, this may be done by programming the switch, or it's associated computer system, with the necessary interactive voice response (IVR) menus. Subscribers may then use their telephone to navigate and interact with the system via the same voice channel used for talking, either by pressing keys on their telephone or in some speech-recognition enabled systems by speaking commands.

Telephones with visual screens that allow user interaction provide another easy means of interfacing with the system. When these telephones are used, the communication between the telephone and the unit-minute system may or may not occur using voice channels and may instead occur using a data communication protocol such as the TCP/IP.

In the case when the telecommunication access device or other digital access device communicates using a data protocol, the computer system of the unit-minute system integrates with or contains the data protocol servers and adapters necessary to communicate with the device. For example, it is obvious that an Internet web site could be constructed with the user interface necessary to allow subscribers to perform all enabled unit-minute transactions. In this case, the unit-minute system remote input server includes a web server, which hosts the web site and communicates the user's input, through the subscriber input device of a web browser to the computer system of the present invention.

The unit-minute system also allows its subscribers to use financial access devices such as ATM/POS terminals and ATM or debit/credit cards to access their prepaid unit-minute accounts. This innovation is accomplished by interfacing the computer system of the present invention with the ATM/POS financial networks. Because membership in these financial networks entails several industry-related requirements, interfacing such financial networks may be performed by means of intermediary computers system associated with a traditional bank or financial institution.

In addition, the UMACH network associated with the unit-minute system interfaces with interbank financial networks such as CHIPS or SWIFT in order to perform daily reconciliation and settlement among and with each member.

In a preferred embodiment, the system interfaces with wireless networks through its integration with the prepaid telecommunications system. Though the system does not need to interface directly with the wireless telecommunication network, the effect of the system's integration is that the system is accessible by all associated wireless network subscribers.

The system preferably integrates with the public switched telephone network (PSTN) in order to enable inbound and outbound calls, and to send transaction receipts or notifications to its customers via voice recording, page or facsimile message. The system is also optionally interfaced with the Internet in order to send email messages, such as transaction receipts or notifications to customers.

Accordingly, it is a primary object of the present invention to provide a system and method which allows its subscribers to access the value associated with their stored value accounts for uses other than as originally intended, wherein the access is defined as the purchasing, transferring, redeeming and other advantageous use of unused prepaid telecommunication-time.

Accordingly, with respect to an example provided herein, it is also a primary object of -the present invention to provide a system and method which allows its subscribers to access the value associated with their prepaid telecommunication-time for uses other than placing telephone calls, wherein the access is defined as the purchasing, storing, exchanging, converting, transferring, redeeming and other advantageous use of unused prepaid telecommunication-time.

It is another object of the present invention to allow access of the value associated with their prepaid telecommunication-time by traditional telecommunication devices, such as telephones and any device operably associatable with the telecommunication lines of a telecommunication switching network. Access of the value may also be made through financial network access devices, such as debit cards and ATMs and any device operably associatable with financial networks. Access of the value may also be made through digital computing devices, such as handheld computers or personal digital assistants, or any device operably associatable with digital information networks. Access of the value may also be made through human customer service representatives either in person or by telephone.

It is a further object of the present invention to provide a system and method whereby telecommunication-time becomes a commodity, and exchanges and/or secondary markets and/or derivative markets exist, and wherein, telecommunication-time may be traded and/or hedged against, between countries, banks, telecommunication carriers, companies and other entities.

It is yet another object of the present invention to provide a method and system of providing such services without construction of new financial and telephone networks, but instead to leverage existing telephone and financial networks to implement such a system and method.

It is yet a further object of the present invention to provide a method and system of providing such services without relying on a new access device technology, but instead to leverage existing access device technology, including telephone, especially cellular or digital wireless telephone and financial network access devices to implement such a system and method.

It is still another object of the present invention to provide a method and system for banks and other financial institutions to enable their customers to use the value in their deposit accounts for acquiring telecommunication-time by interfacing a prepaid telecommunication system telecommunication-time account and the customer's bank or other financial institution account.

It is still a further object of the present invention to provide a method and system of linking several unit minute vendors into one clearing-house network and reconciling and settling unit minute transfers among members.

Still other objects and advantages of the invention will in part be obvious and will in part be apparent from the following detailed specification.

The invention accordingly comprises the several steps and the relation of one or more such steps with respect to each of the others, and the systems embodying features of construction, combinations of elements and arrangement of parts which are adapted to effect such steps, all as exemplified in the following detailed disclosure, and the scope of the invention will be indicated in the claims.

BRIEF DESCRIPTION OF THE DRAWINGS

For a more complete understanding of the present invention and its associated objects and advantages, reference is now made to the following description taken in conjunction with the accompanying drawings, in which.

Prior Art

Prior Art

Prior Art

Prior Art

DETAILED DESCRIPTION OF THE INVENTION

Referring now to FIGS. 2A through 7D, the prior art and the method and system for enhancing a prepaid telecommunication system according to a first aspect of the invention will be described. It is useful to first describe the prior art prepaid telecommunication system with which the system will integrate.

Figure 1A:
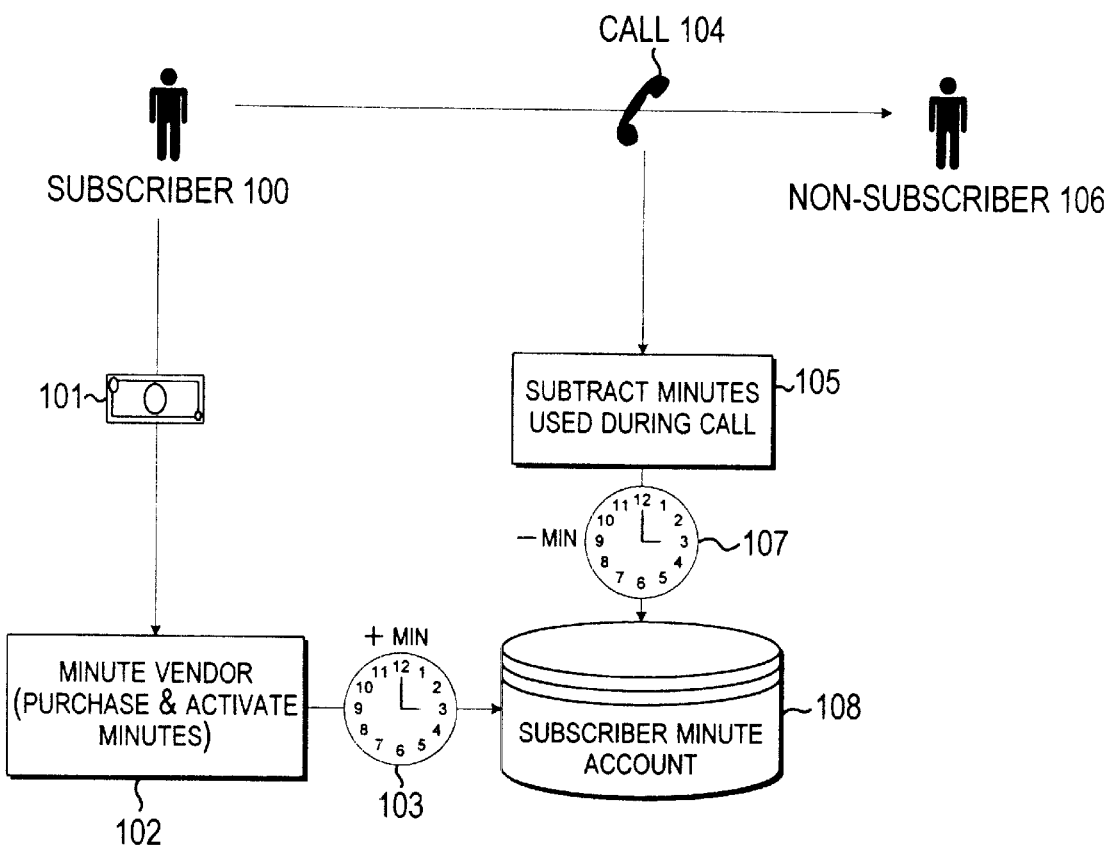
FIG. 1A is a diagram illustrating the use of a prior art prepaid telecommunication system.
Figure 1B:
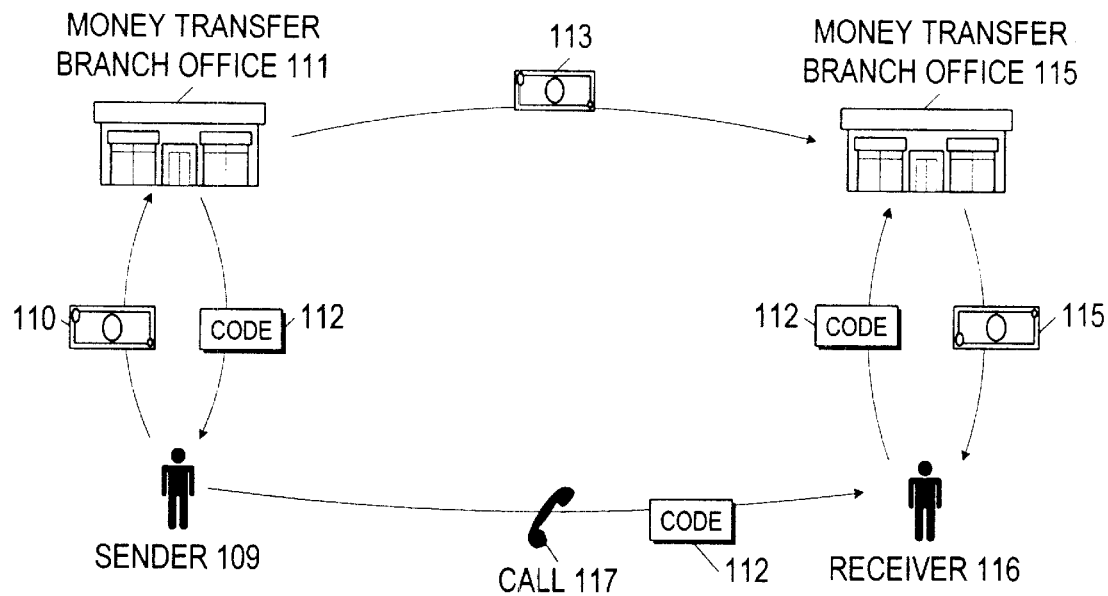
FIG. 1B is a diagram illustrating the use of a prior art money transfer system.
Figure 1C:
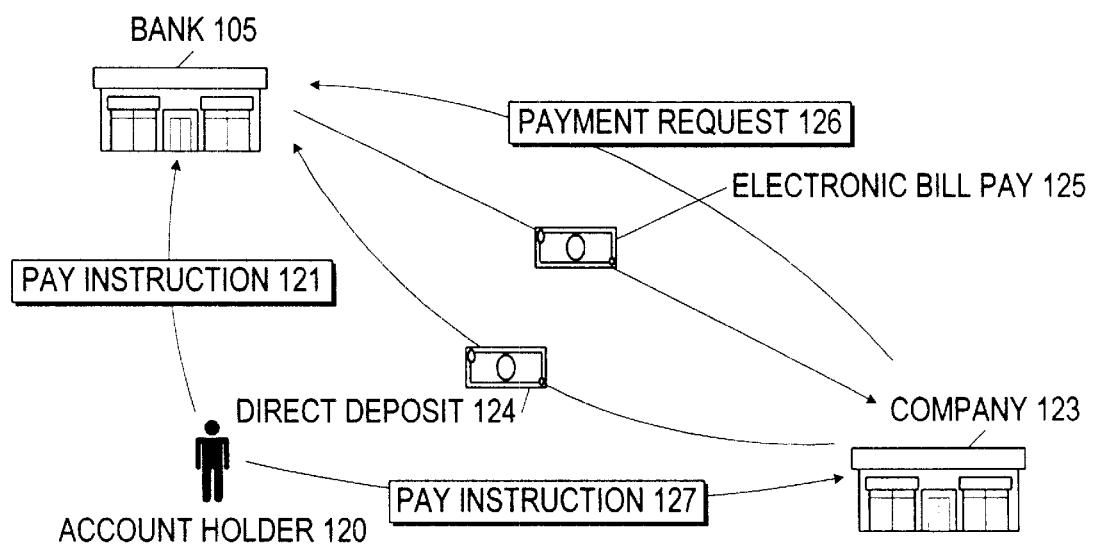
FIG. 1C is a diagram illustrating the use of a prior art bank account-related money transfer system.
Figure 1D:
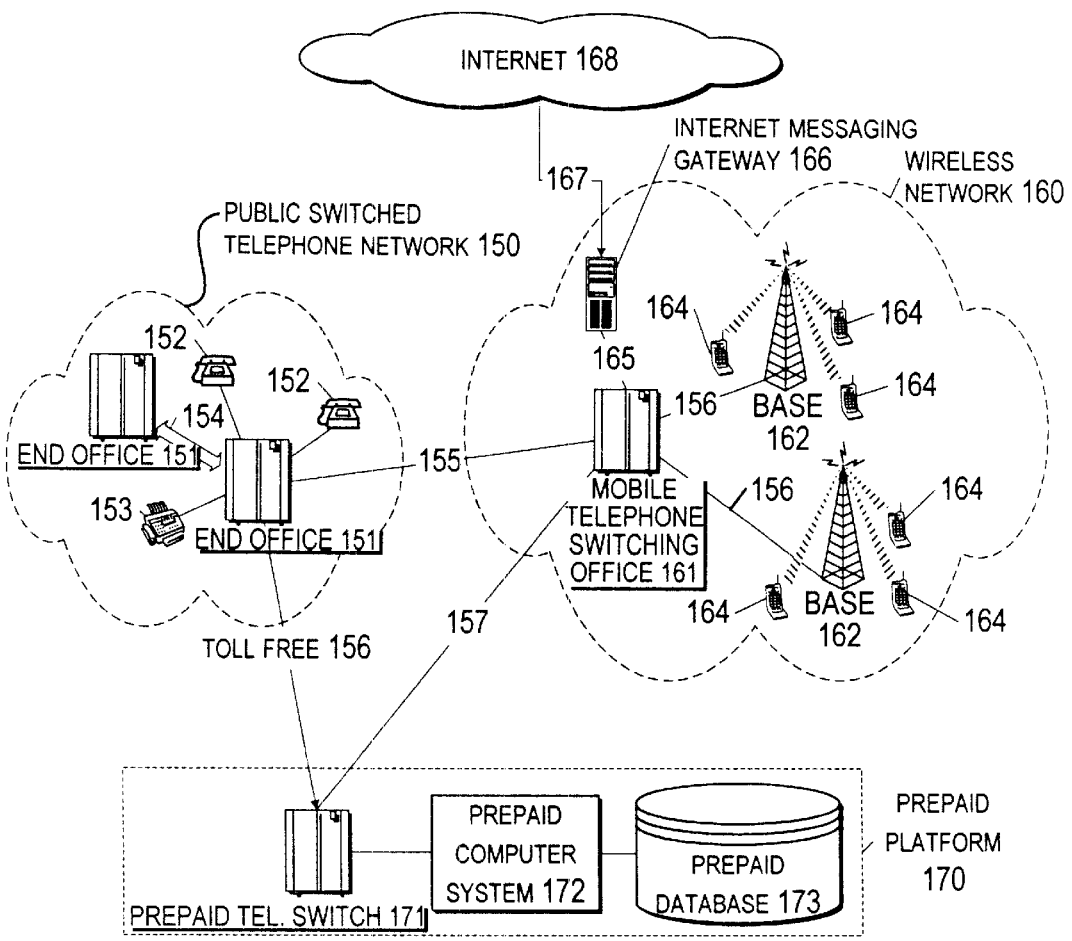
FIG. 1D is a schematic representation of telecommunication-switch-based prior art prepaid telecommunication system.

In a preferred embodiment, the unit-minute system is integrated with a wireless telephone network and a telecommunication switch-based prepaid telecommunication system. FIG. 1D illustrates such a system which allows its subscribers to place prepaid telephone calls from their wireless telephones. A portion of a public switched telephone network, PSTN 150, and a portion of a traditional wireless telephone network 160, are schematically represented. As illustrated, an end office 151 is connected to a subscriber telecommunication device, such as a telephone 152 and a facsimile machine 153. End office 151 is linked to other end offices of PSTN 150 via a telecommunication line 154. In addition, end office 151 is in communication with mobile telephone switching office, MTSO 161 of wireless network 160 by way of a telecommunication line 155, allowing telephone connections to be made between the two networks. As illustrated, MTSO 161 is connected to a plurality of wireless base units 162 via a plurality of separate telecommunication lines 156. Each wireless base unit 162 communicates with a plurality of wireless telephones 164 located within a geographic "cell" centered on wireless base unit 162 via wireless communication signals, typically in the radio frequency. In addition, some wireless networks contain an Internet messaging gateway 166 which may be used, for example to receive email from an Internet 168 using a communication line 167, and convert it into text pages which are sent wirelessly to the appropriate wireless handset 164 via a communication line 165 and MTSO 161.

A telecommunication line 157 between MTSO 161 and a traditional prepaid telephone switch 171 allows MTSO 161 to route outbound telephone calls placed by prepaid wireless subscribers to a prepaid platform 170 for authorization. MTSO 161 distinguishes prepaid subscribers from other subscribers by analyzing a unique electronic serial number (ESN) information sent along with each wireless call. The ESN is also passed to prepaid switch 171 so that the subscriber can be identified by prepaid platform 170. Prepaid platform 170 looks up the customer in a subscriber database 173 in communication with a prepaid computer system 172. Prepaid computer system 172 contains the programming logic that performs the traditional prepaid platform functions. Once the caller has been identified, prepaid platform 170 may inform the caller of their current account balance and ensures that the minute balance is sufficient to cover the call. If the current balance is insufficient to complete the call, the caller is typically given the option of purchasing additional minutes, traditionally via a credit card purchase, or not completing that call. If the balance is sufficient and the caller chooses to complete the call, the call is redirected back via MTSO 161 to its final destination. After the call ends, or in some systems as the call progresses, the number of minutes spent on the call is deducted from the caller's account balance.

Figure 2A:
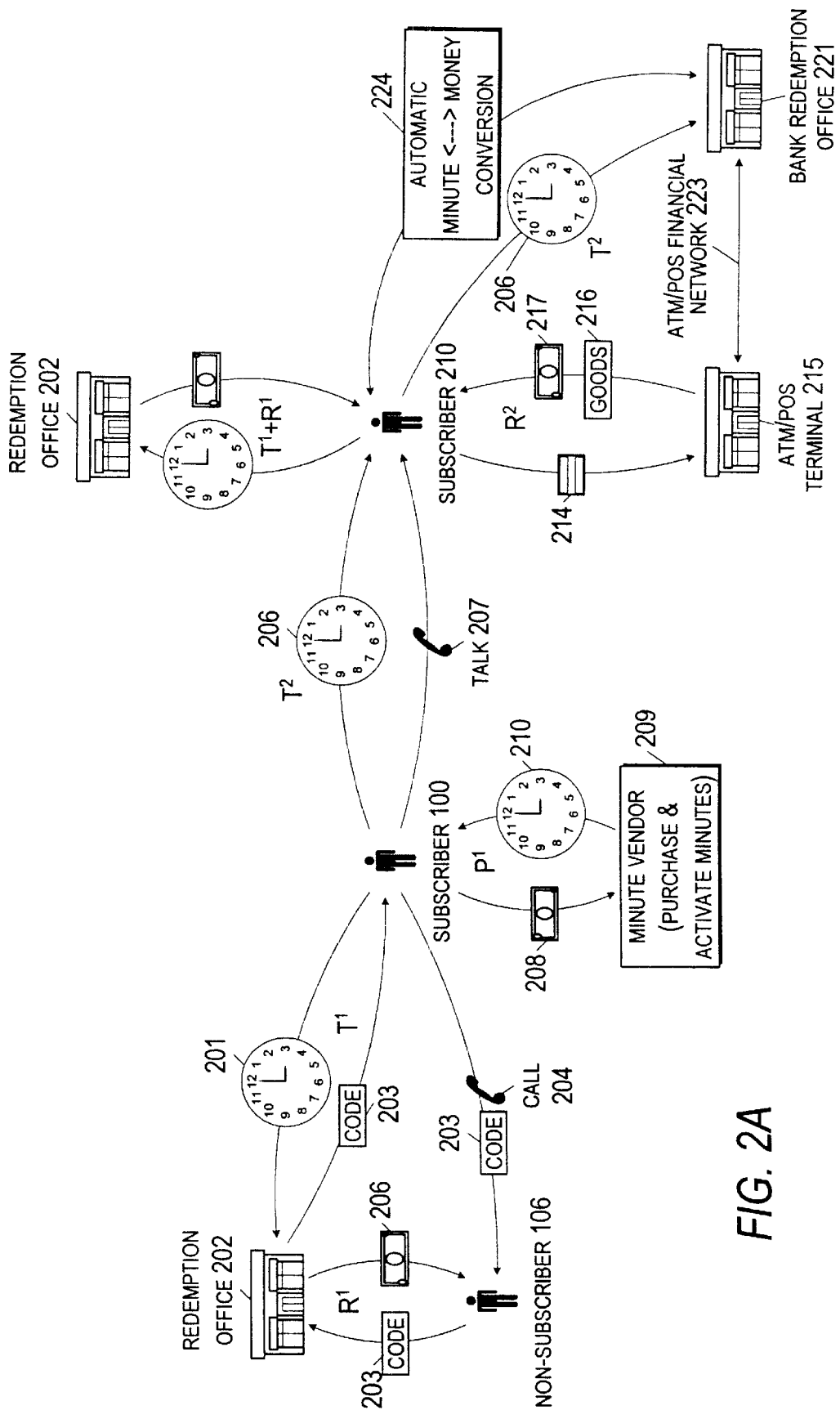
FIG. 2A is a diagram illustrating a wide number of unit-minute transactions made possible by the present invention.

As described herein, the system of the present invention allows a plurality of unit-minute related transactions. FIG. 2A diagrammatically illustrates a number of these transactions. A purchase transaction $P^1$, is included for completeness and illustrates subscriber 100 purchasing and activating prepaid minutes from a prepaid minute vendor using either the prior-art prepaid calling card purchase method or the prior-art credit card purchase method.

A transfer transaction $T^1$ illustrates one example in which the unit-minutes system allows non-subscribers to participate in unit-minute related transactions. In transaction $T^1$, subscriber 100 transfers an amount of unit-minutes 201 to a redemption office 202 for ultimate redemption by non-subscriber 106. During transaction $T^1$, the system informs subscriber 100 of a special transaction code 203. After transaction $T^1$, subscriber 100 informs non-subscriber 106 of code 203 by way of a telephone call 204. In a redemption transaction $R^1$, non-subscriber 106 visits redemption office 202, presents code 203 and, after an authorization process, collects a monetary value 206 associated with redeemed unit-minutes 201.

A transfer transaction $T^2$ illustrates one subscriber transferring unit-minutes to another subscriber. In transaction $T^2$, subscriber 100 transfers an amount of unit-minutes 206 to a subscriber 210. A transaction $T^1 + R^1$ illustrates how subscribers can redeem their own unit-minutes at a redemption office by combining transfer transaction $T^1$ with redemption transaction $R^1$.

In a preferred embodiment, the unit-minute system is associated with a traditional banking or financial services partner 221 who manages bank accounts associated with each unit-minute system subscriber and allows the unit-minute system to integrate with the ATM and POS financial networks and allow, for example, a redemption transaction $R^2$. Redemption transaction $R^2$ illustrates subscriber 210 redeeming unit-minutes using a debit card 214 and an ATM/POS terminal 215. Subscriber 210 may redeem said unit-minutes either in the form of an amount of local currency 217, or certain goods or services 216. During transaction $R^2$, ATM/POS terminal 215 communicates with the bank account associated with subscriber 210 at bank redemption office 221 for transaction authorization. In some system embodiments this authorization process triggers a process 224 of the present invention, which automatically redeems the number of unit-minutes equivalent to the withdrawal amount plus any transaction fees imposed. In other embodiments, subscriber 210 must perform unit-minute transfer transaction $T^2$, in which subscriber 210 transfers unit-minutes 206 to bank redemption office 221, before redeeming unit-minutes at ATM/POS terminal 215.

Figure 2B:
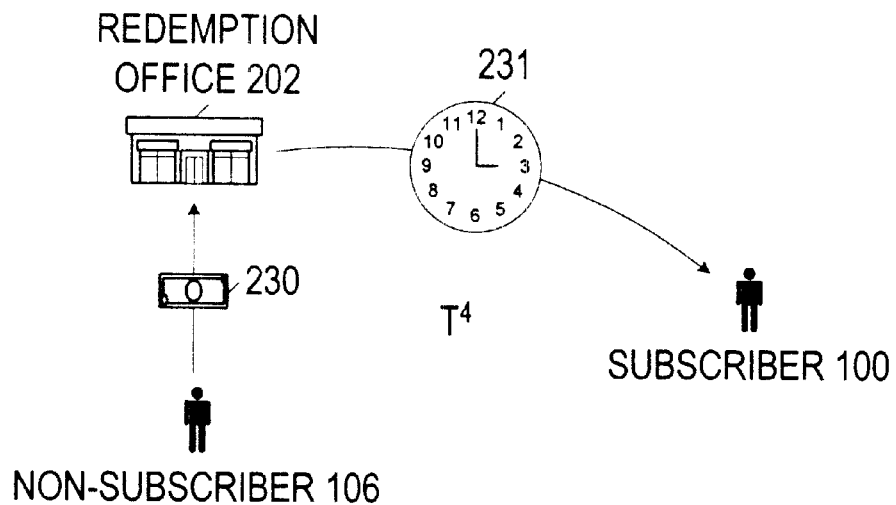
FIG. 2B is a diagram illustrating the non-subscriber to subscriber unit-minute transfer initiation process via redemption office in accordance with the present invention.

In FIG. 2A it is already shown that non-subscribers may redeem unit-minutes sent to a redemption office on their behalf by a subscriber. In some embodiments of the unit-minute system it is preferable to allow non-subscribers to participate in sending transactions as well as receiving transactions. In such embodiments, non-subscribers may be given temporary subscriber IDs that allow them to participate in unit-minute related transactions. FIG. 2B diagrammatically illustrates such a process in a transaction $T^4$. In transaction $T^4$, non-subscriber 106 visits redemption office 202. Either by means of a self-service kiosk or by human assistance, non-subscriber 106 pays a monetary value 230 associated with an amount of unit-minutes 231 to transfer, and receives a temporary subscriber ID. Non-subscriber 106, or a redemption office employee then transfers purchased unit-minutes 231 to subscriber 100 using the temporary subscriber ID.

Given this temporary subscriber approach, it is obvious that the unit-minute system allows transfers between two non-subscribers by combining transaction $T^4$ with redemption transaction $R^1$.

Figure 2C:
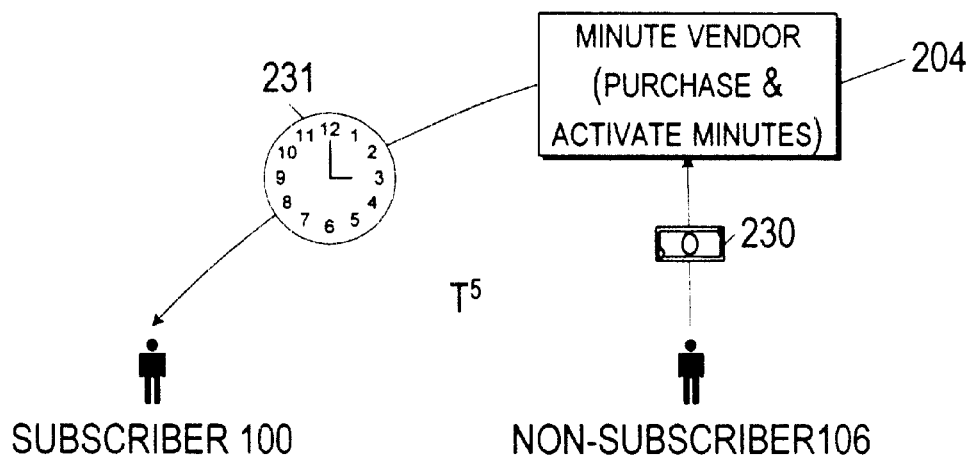
FIG. 2C is a diagram illustrating the non-subscriber to subscriber unit-minute transfer initiation process via prepaid calling card in accordance with the present invention.

FIG. 2C diagrammatically illustrates a transaction $T^5$, yet another example in which the unit-minutes system allows non-subscribers to participate in unit-minute related transactions. In transaction $T^5$, non-subscribers are not given a temporary subscriber ID but instead purchase unit-minutes "on behalf" of subscriber 100. In transaction $T^5$, non-subscriber 106 transfers unit-minutes 231 to subscriber 100 by purchasing a prepaid calling card, not shown, from a minute vendor 204. Non-subscriber 106 then activates the prepaid calling card on behalf of subscriber 100 by inputting subscriber 100's subscriber ID during the activation process.

Figure 3A:
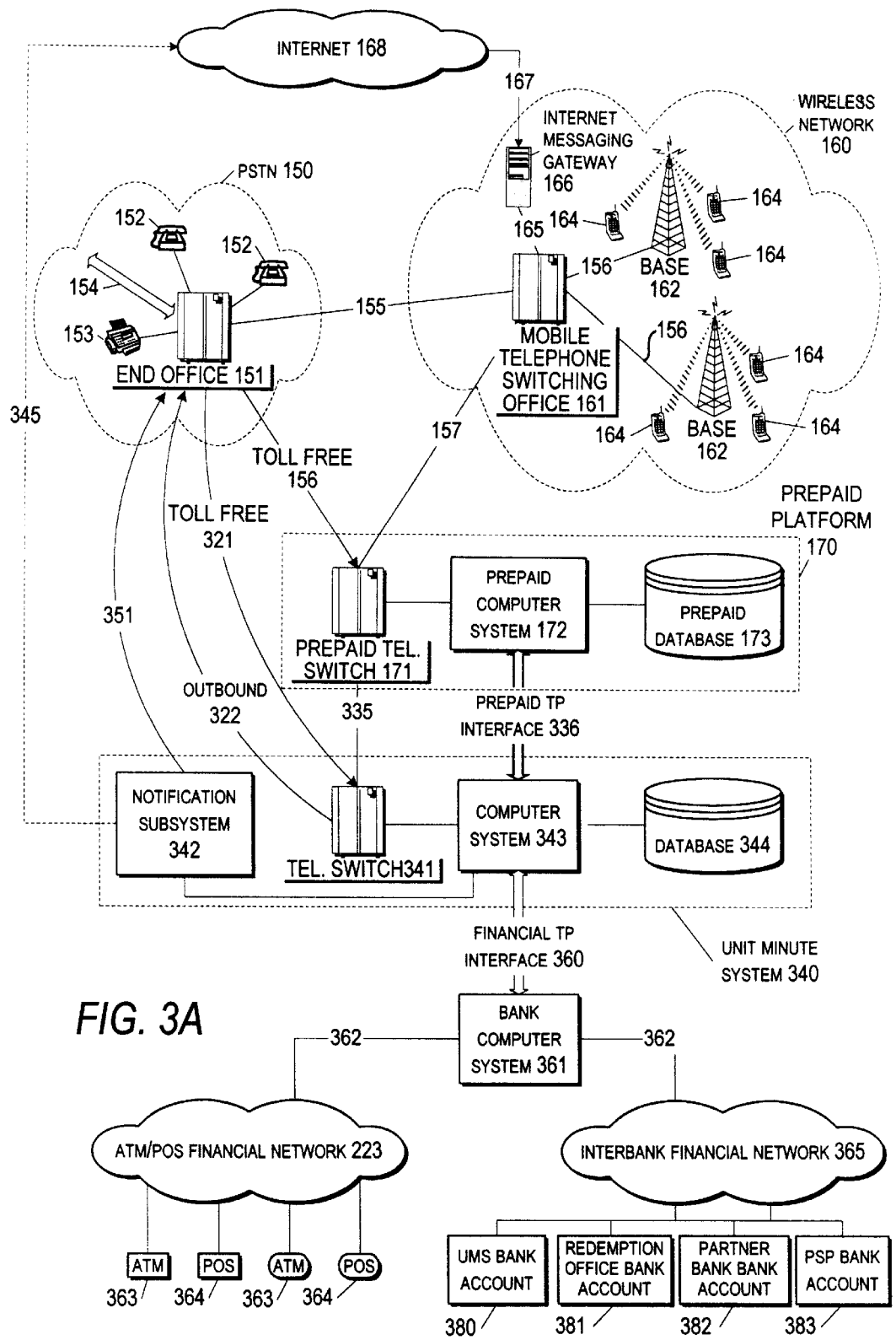
FIG. 3A is a schematic representation of the unit-minute system of present invention integrated with the Public Telephone Network, Wireless Telephone Network, Internet and Financial Networks.

FIG. 3A is a schematic representation of a preferred embodiment of a unit-minute system 340 in which said system is integrated with public switched telephone network 150, prepaid telecommunication platform 170, wireless telecommunications network 160, an ATM/POS financial network 223, an interbank financial network 365 and Internet 168. Communication between PSTN 150, wireless network 160 and prepaid platform 170 is also illustrated in FIG. 1D and described herein. In a preferred embodiment, unit-minute system 340 is comprised of a computer system 343, a database 344, a telecommunications switch 341 and a notification subsystem 342.

Subscribers may access their unit-minute account with telecommunication access devices, such as telephones, by, for example, placing a toll-free telephone call 321 with telecommunication-switch 341. Telecommunication-switch 341 may be programmed by computer system 343 with interactive voice response (IVR) menus, not shown, which allows subscribers to navigate and interact with the system via the same voice channel used for talking, either by pressing keys on their telephone or with the aid of a speech recognition subsystem, not shown, by speaking commands. In some embodiments, such speech commands may be given during a normal telephone call conversation. In addition, in a preferred embodiment, users of wireless handset 164 are provided with a means of directly accessing telecommunication-switch 341 without the need of toll-free line 321. This may be accomplished by several methods. In one example of such a method, prepaid switch 171 is configured to route telephone calls to switch 341 via a telephone line 335, whenever the caller chooses a particular menu option on prepaid switch 171. In another method, MTSO 161 is configured to route telephone calls directly to switch 341 via a telephone line, not shown, whenever the caller presses a particular key combination on wireless handset 164, such as #646 (#MIN). Telecommunication-switch 341 also communicates with end office 151 via a telephone line 322 to allow unit minute system 340 to connect sending subscribers to the receiving party after a unit-minute transfer.

Computer system 343 communicates with prepaid computer system 172 using a prepaid transaction processing interface 336 to perform the unit-minute transactions invoked by subscribers. Prepaid transaction processing interface 336 integrates the transaction processing subsystem and/or adapter, not shown, of unit-minute system 340 with the transaction processing subsystem and/or adapter, not shown, of prepaid platform 170 such that any changes made by either system to data fields shared between the systems such as fields associated with the prepaid minute balance, are communicated across prepaid transaction processing interface 336 to each system's transaction processing subsystem. Each system's transaction processing subsystem will in turn communicate with its respective database 344 and 173 as needed to store any changed fields. Prepaid transaction processing interface 336 is a message-passing interface which is designed to safely and efficiently handle the high number of transactions which will pass across it.

Computer system 343 also communicates with a notification subsystem 342 to send notification messages and/or receipts to subscribers and redemption offices. Notifications in the form of telephone calls, voicemail recordings, text pages or facsimile messages are sent via a telephone line 351 to end office 151 of PSTN 150. An optional data communication line 345 between notification subsystem 342 and Internet 168 allows notifications in the form of Internet-based email messages to be sent. Such email messages are then delivered by email gateways, not shown, associated with Internet 168. Email messages sent to wireless handset 164 are delivered to messaging gateway 166 of wireless network 160. Internet messaging gateway 166 then communicates with MTSO 161 to convert the email to a text message and send it wirelessly to wireless handset 164.

Computer system 343 also communicates with a bank computer system 361 via a financial transaction processing interface 360. Financial transaction processing interface 360 integrates the transaction processing subsystem and/or adapter, not shown, of unit-minute system 340 with the transaction processing subsystem, not shown, of bank computer system 361 in order to allow both ATM/POS financial network 223 integration and the unit-minute settlement process described herein.

With respect to ATM/POS financial network 223 integration, bank computer system 361 is linked to financial network 223 by a communication line 362. Subscribers accessing their unit-minute accounts via a debit card use an ATM terminal 363 and a POS terminal 364 to make withdrawal or purchase requests. These requests are routed across financial network 223 to bank computer system 361 where they are processed. The method of processing by bank computer system 361 depends upon whether the "automatic" or "manual" method of bank account integration is used.

If the "automatic" method of bank account integration is in use, bank computer system 361 will communicate with computer system 343 via financial transaction interface 360 in order to request that a number of unit-minutes equivalent to the withdrawal or purchase amount be redeemed. Computer system 343 then accesses database 344 to determine if the subscriber's unit-minute balance is sufficient to grant this request, including any related transaction fees, if any. If it determines that the account balance is sufficient it will transfer the unit-minutes from the subscriber's account to bank computer system 361. Bank computer system 361 will then grant the withdrawal or purchase request and send an approval message, not shown, back to originating terminal 363 or 364 via financial network 223. Originating terminal 363 or 364 will then remit the money or approve the purchase.

If the "manual" method of bank integration is in use, the subscriber must first transfer an amount of unit-minutes to the bank before using the debit card redemption process. In this method, the bank acts as a special redemption office allowing subscribers to redeem unit-minutes with their debit cards.

With respect to the integration of unit-minute system 340 with an interbank financial network 365, bank computer system 361 is linked to interbank financial network 365 by a communication line 362. This link allows bank computer system 361, and thus through interface 360, computer system 343, to perform the unit-minute settlement process by transferring money to and from a unit-minute account 380, a redemption office account 381, a partner bank account 382 and a prepaid service provider account 383. The settlement process is further illustrated in FIG. 3B.

Figure 3B:
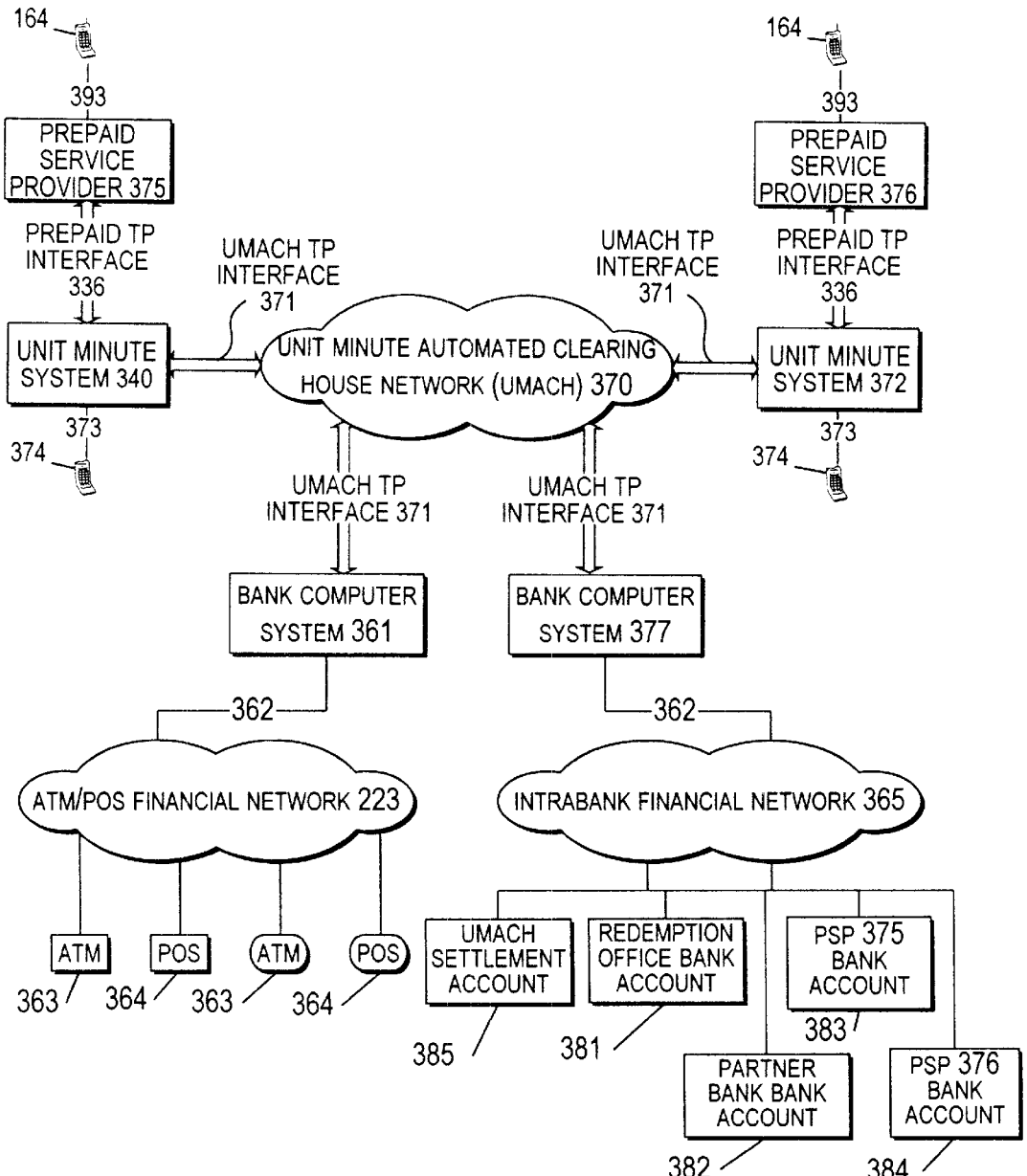
FIG. 3B is a schematic representation of a national or international network of unit-minute systems involving a plurality of prepaid platforms, wireless networks and computer systems.

FIG. 3B is a schematic representation of a large-scale implementation of the system of the present invention in which a unit-minute automated clearing house (UMACH) network serves to interconnect a plurality of member prepaid telecommunication service providers, PSPs, a plurality of member unit-minute systems associated with those PSPs and a plurality of member bank computer systems associated with financial networks. In this configuration, a UMACH 370 serves as a clearinghouse for unit-minute transactions that involve multiple PSP network members and/or multiple bank network members. Unit-minute system (UMS) 340 and a different UMS 372 communicate with UMACH 370 via a UMACH transaction processing interface 371. UMACH TP interface 371 is a message-passing transaction protocol interface that serves the following purpose.

First, UMACH TP interface 371 enables network members to submit unit-minute transactions to UMACH network 370. For example, a subscriber, not shown, of PSP 375 may invoke a unit-minute transfer transaction via a remote input device 374, such as a telephone, PDA, etc., and communicates with a remote input server subsystem of UMS 340, such as a telecommunication-switch or web server, not shown. If said transaction involves a subscriber of a PSP 376, the transaction is posted via UMACH TP interface 371 to UMACH network 370. Next, UMACH network 370 determines which UMS system is associated with said subscriber and then communicates via UMACH TP interface 371 to the appropriate UMS, in this case UMS 372, which is associated with PSP 376 via prepaid TP interface 336. In this fashion, UMS 340 and UMS 372 work in conjunction with UMACH 370 to complete the transaction.

Similarly, if a subscriber of PSP 375 invokes a unit-minute redemption transaction via ATM terminal 363 or POS terminal 364, bank computer system 361 would post a corresponding unit-minute transfer transaction to UMACH 370 requesting that an equivalent number of unit-minutes be transferred to bank computer system 361's unit-minute account. UMACH 370 analyzes this transaction and communicates with the unit-minute system associated with the subscriber's PSP, in this case UMS 340, to effect the transaction by debiting the appropriate number of unit-minutes from the unit-minute account stored on PSP 375. Next, UMACH 370 credits the unit-minute account of bank computer system 361 the appropriate number of unit-minutes.

After the transaction has been performed it is stored by UMACH 370 for processing during the settlement process. At some regular interval, preferably at the end of each business day, UMACH 370 performs the settlement process. The settlement process analyzes all unit-minute transactions, associated transaction fees and transaction commissions and determines the net flow of unit-minutes between all network members. Once this has been determined, UMACH 370 will send a message via UMACH TP interface 371 to bank computer system 377 requesting that it issue appropriate payment requests, via interbank financial network 365, to all members who owe unit-minutes to UMACH 370 network. This payment request is in the form of the currency equivalent of the owed unit-minutes and is directed to be made to a UMACH settlement account 385. Interbank financial network 365, through its own settlement process, then communicates with each bank associated with the owing member's bank account to effect payment.

Once all payments have been made to UMACH settlement account 385, UMACH network 370 issues a second set of payment requests, via interbank financial network 365, to all members who are owed unit-minutes. Interbank financial network 365, through its own settlement process, then communicates with each bank associated with the owed member's bank account to effect payment, thus completing the settlement process.

Figure 4A:
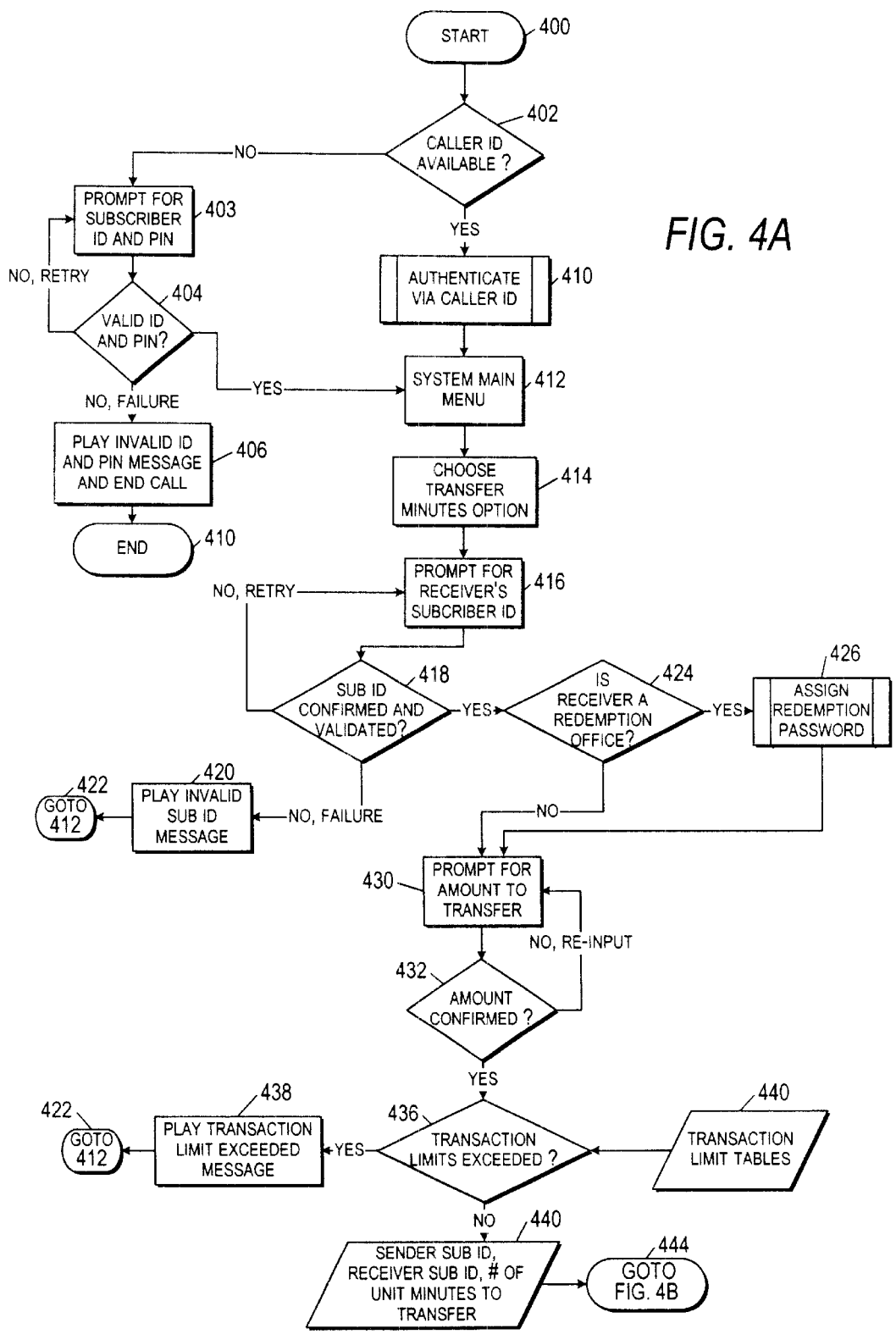
FIG. 4A is a schematic flowchart illustrating authentication, user interaction and confirmation processing in accordance with an aspect of the present invention that allows subscribers to transfer unit-minutes between subscriber accounts using a telephone handset.

FIG. 4A is a schematic flowchart illustrating authentication, user interaction and confirmation processing during a telephone initiated unit-minute transfer. Before allowing callers to initiate transactions they must be properly authenticated. The method begins at a start 400. In a first step of this process, a decision 402 analyzes whether caller ID information has been sent along with the call. If caller ID is present, a step 403 compares the caller ID with the subscriber IDs of all known subscribers. If there is match, the caller is authenticated and taken to a main menu at a step 412. For added security the system may also require the caller to enter a subscriber PIN at this point.

If the caller ID information is not available in decision 402, a step 403 prompts the caller to input their subscriber ID and PIN. A decision 404 accesses the database, not shown, to determine if these values are valid. If they are not, the caller is allowed to re-input the values several times. If after several tries the caller has not been authenticated, a step 406 plays a failure message and a step 410 ends the call. If decision 404 determines that the values input by the caller are valid, the caller is authenticated and taken to the main menu at step 412.

If the subscriber chooses the "transfer unit-minutes" menu option in the main menu, he is taken to a step 414, then a step 416 prompts the subscriber to enter the receiving subscriber's ID. A decision 418 then confirms the input with the subscriber and validates it using the unit-minute system database 340 or the UMACH network 370. If decision 418 determines the ID is invalid after several tries, a step 420 plays a failure message and the user is transferred back to the main menu at step 412. If the receiver subscriber ID is valid, a decision 424 determines whether the receiver account is associated with an individual subscriber or a redemption office. If it is associated with a redemption office, then the caller is sending unit-minutes that may later be redeemed and process 426 assigns a redemption password to the transaction. Next a step 430 asks the caller to enter the number of unit-minutes they wish to transfer. For convenience, callers are reminded of their account balance and may enter the amount in terms of local currency. A decision 432 then confirms the amount with the caller. Once the caller has confirmed the amount, a decision 436, using values stored in a transaction limit table 440, validates that the amount is above the minimum allowed transfer amount and below the maximum allowed transfer amount. If the amount exceeds any of the transaction limits a message explaining this is played at a step 438 and the caller is returned to the main menu at step 412. At this point, the initial transaction setup is complete. A step 440 stores the acquired information, the subscriber ID, receiver ID and amount of unit-minutes to transfer and the process continues in FIG. 4B.

Figure 4B:
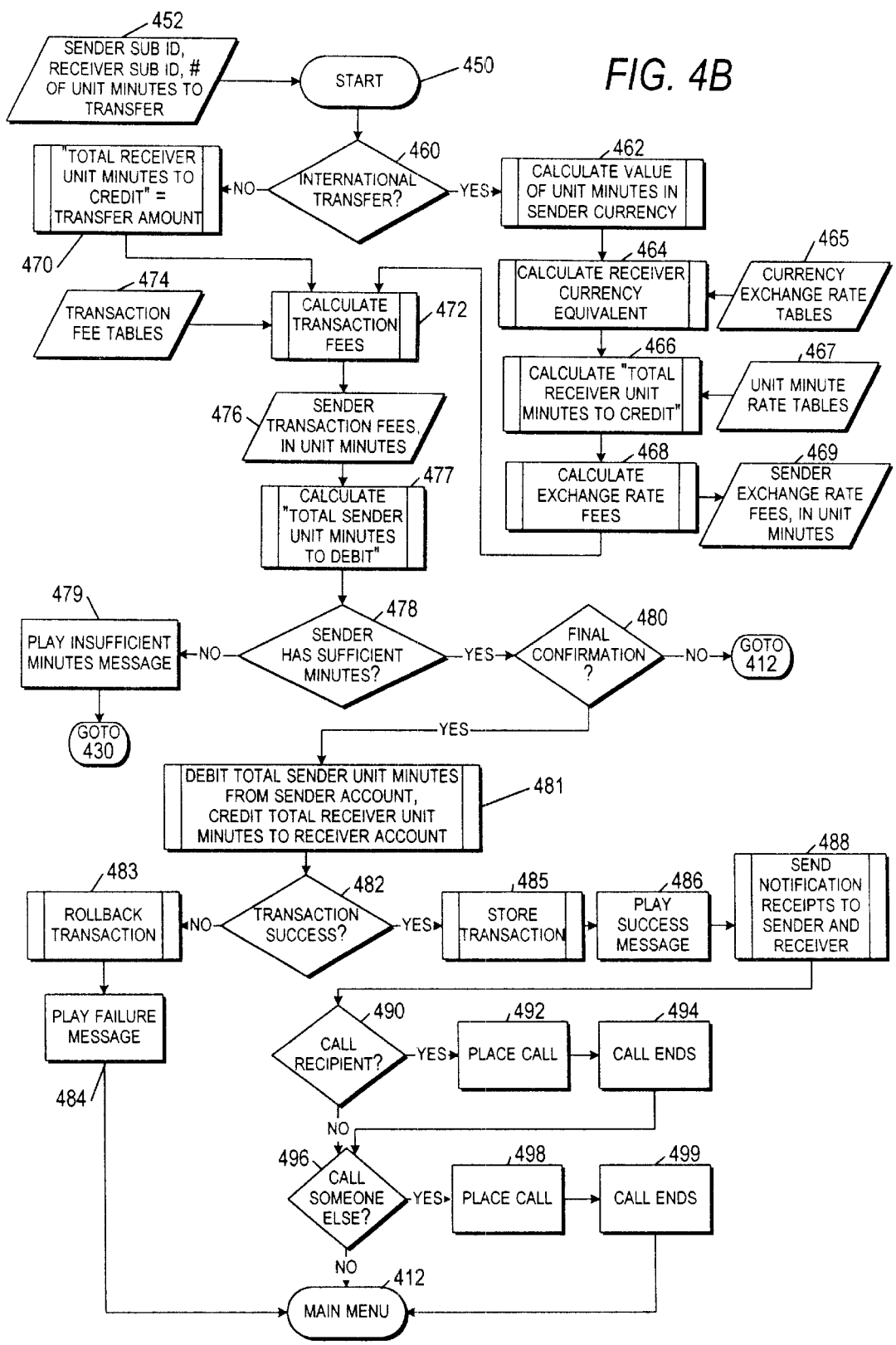
FIG. 4B is a schematic flowchart illustrating the completion of the unit-minute transfer process in accordance with the present invention.

FIG. 4B is a schematic flowchart that illustrates the completion of the unit-minute transfer transaction begun in FIG. 4A. It illustrates transfers between subscribers who share the same currency and transfers that cross currency boundaries as well as transfers between normal subscribers and transfers to non-subscribers via redemption offices.

The process begins at a start 450 which takes as input the information collected in the proceeding process steps, shown as a data input 452. A decision 460 analyzes this information to determine if the transfer crosses a currency boundary. If the transfer is an international transfer the system branches to a process 462 where the currency exchange handling begins. First, process 462 calculates the value, in the sender's currency, of the unit-minutes about to be transferred. Next, a process 464, in conjunction with a currency exchange rate tables 465, calculates the equivalent value in the receiver's currency. Next, a process 466, using a unit-minute rate tables 467, calculates the number of receiver unit-minutes equivalent to this amount of receiver currency. Finally, a process 468 calculates the exchange rate fees to be assessed to the sender and returns an output data 469.

After performing the currency exchange rate calculations, or in the case that no currency exchanges occur and the amount transferred is set equal to the receiver credit in minutes at a process 470, a process 472, in conjunction with a transaction fee tables 474 then calculates the total of all transaction fees, in unit-minute terms, to be charged to the sending subscriber and stores this value in a step 476. A process 477 adds this transaction amount to the original unit-minute transfer amount and calculates the total number of sender unit-minutes to debit from the sender's account.

At this point in the transaction, all necessary fee computations have been completed so a decision 478 confirms whether the sender has sufficient unit-minutes in their account to perform the transfer. This calculation is somewhat imprecise because as the call is progressing, unit-minutes are being deducted from the sender's account. If the sender does not have sufficient unit-minutes in their account, the caller is informed of this fact at a step 479 and is given the option to purchase more minutes, at a step 430, or are returned to step 446 where they may enter a lesser amount. If the sender's account balance is sufficient, a step 480 performs a final confirmation by playing a message for the sender repeating the complete transaction including any transaction and exchange fees assessed. If the caller does not confirm the transaction, a failure message is played and the caller is returned to the system main menu at step 412. If the transaction is confirmed, a process 481 attempts to debit the total number of unit-minutes transferred plus any transaction fees from the sender's account and credit the total number of transferred unit-minutes to the receiver's account.

If a decision 482 determines that the transaction was unsuccessful, a process 483 undoes all effects of the attempt. A step 484 then plays a failure message and returns the caller to the main menu at step 412. If the transaction was successful, a process 485 stores the transaction for the later settlement process and a step 486 informs the caller of the transaction's success and of the unique transaction ID assigned to the transaction. In addition, if the transaction involved a redemption office, step 486 may play a message, reminding the sender of the redemption password. A step 488 then sends a notification receipt to both the sender and receiver. This message may be sent in a number of formats, including but limited to, voicemail, email, facsimile message or text page sent to the wireless handset. In all cases, the message contains the sender's subscriber ID, the amount transferred and the transaction ID associated with the transfer. For security reasons, the redemption password, if one exists, is only sent to the sending subscriber.

Next, the sender is asked by if they wish to place a telephone call to the recipient in order to personally inform them of the transfer, or in the case of a transfer to a redemption office to ask for directions or office hours at a decision 490. If the sender chooses to place the call, a step 492 places a standard telephone call, just as if the sender had dialed the number manually. After the call is ended in a step 494 or if the sender does not choose to call the recipient, the sender is asked if they wish to call someone else to notify them of the transfer at a decision 496. For example, if the sender has just sent unit-minutes to a non-subscriber friend via a redemption office, they may wish to notify the friend via telephone, that the transfer has been completed and inform them of which redemption office to visit to redeem the unit-minutes. They must also inform their friend of the redemption password and transaction ID needed to complete the redemption process. If the sender does wish to place a call, a step 498 prompts them to enter the number they wish to dial, and then makes a standard prepaid telephone call to the number entered. After the call is ended in a step 499 or in the case that no call was made, the sender is returned to the main menu at a step 412, completing the transfer process.

Figure 5A:
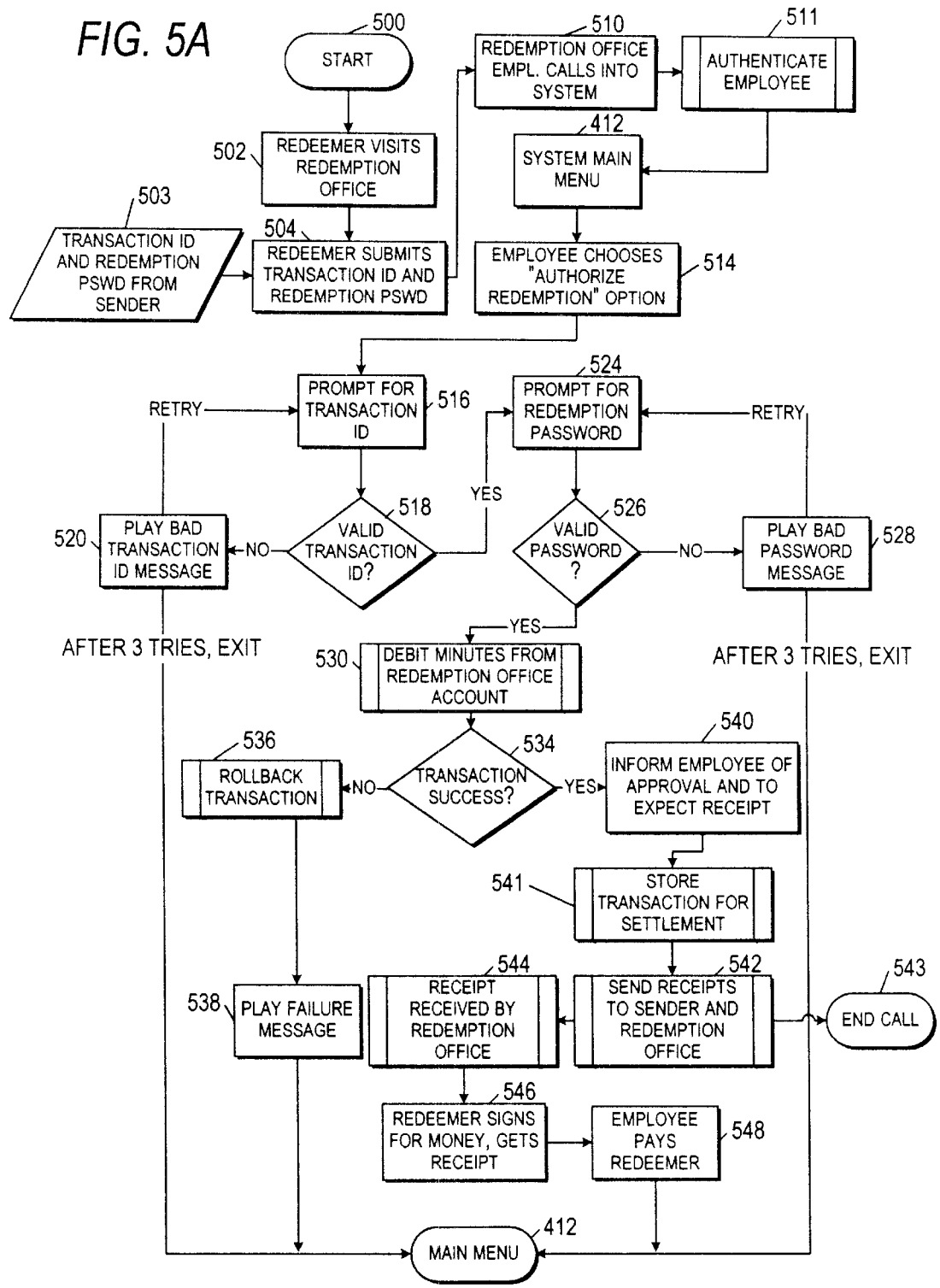
FIG. 5 is a schematic flowchart illustrating the initiation via telephone of the unit-minute redemption process in accordance with an aspect of the present invention that allows subscribers to redeem prepaid unit-minutes as local currency at a redemption office.

FIG. 5A is a schematic flowchart illustrating the unit-minute redemption process in accordance with an aspect of the current invention that allows subscribers to redeem prepaid unit-minutes as local currency at a redemption office. The process begins at a start 500. An individual who wishes to redeem unit-minutes first visits a redemption office at a step 502. This individual, who shall be hereafter termed the "redeemer" may be a subscriber wishing to redeem his or her own unit-minutes or a non-subscriber who has been "sent" money by a subscriber. In either case, prior to redeeming the unit-minutes, a subscriber must have transferred some minimum number of unit-minutes to a redemption office as shown in FIG. 4A and FIG. 4B. After this transfer, the redeemer must be notified of the transaction ID and redemption password represented in a data block 503.

In a step 504 the redeemer submits the transaction ID and redemption password to a redemption office employee. In a step 510 the employee places a telephone call into the system in order to authorize the transaction. A process 511 authenticates the caller in a manner described in FIG. 4A. After authentication the caller hears the main menu at a step 412 and chooses "authorize redemption" in a step 514. Next, a step 516 prompts the caller for the transaction ID. A decision 518 then determines if the transaction ID entered is valid. If it not valid, a step 520 plays the caller a failure message and allows the caller to re-enter the ID by returning them to step 516. After three failed attempts, the caller is returned to the main menu at step 412. If the transaction ID is valid, a step 524 prompts the caller to enter the redemption password. A decision 526 then determines if the password entered matches the password associated with the given transaction. If the password is not valid, a step 528 plays the caller a failure message and allows them to re-enter the password by returning them to step 524. After three failed attempts, the caller is returned to the main menu at step 412.

If the redemption password is valid the system performs the actual transaction by debiting the associated unit-minutes from the account of the redemption office in a process 530. A decision 534 determines if the transaction was successfully completed. If the transaction was unsuccessful, a process 536 undoes all effects of the attempt, a step 538 plays a failure message and then returns the caller to the main menu at step 412.

If decision 534 determines the transaction was successful, a process 541 stores the transaction for later settlement in which the redemption office will be reimbursed by the UMACH network for the unit-minutes redeemed. Next, a process 542 sends a transaction receipt to the redemption office and to the sending subscriber for their records. A step 543 ends the call and the employee hangs up the telephone. In a step 544, the receipt is received by the redemption office which then asks the redeemer to sign for their money in a step 546. Finally, in a step 548, the employee pays the redeemer the monetary value of the redeemed unit-minutes.

Figure 6:
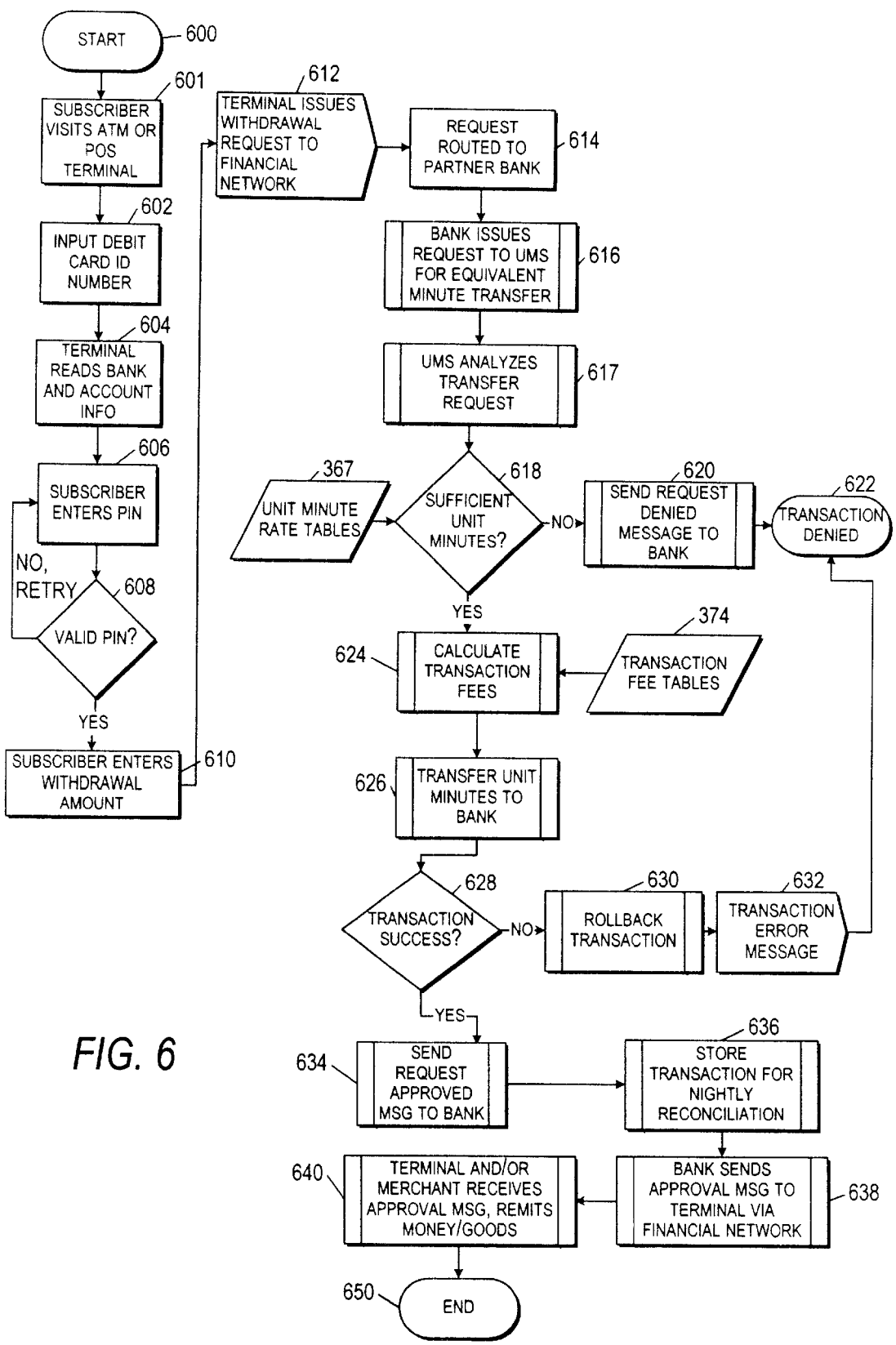
FIG. 6 is a schematic flowchart illustrating the method used to interface with the ATM/POS financial networks in order to allow subscribers to redeem their unit-minutes using an ATM and debit card.

FIG. 6 is a schematic flowchart illustrating the method used to interface with the ATM/POS financial networks in order to allow subscribers to redeem their unit-minutes using a debit card or other card accepted by such systems. Those of ordinary skill in the art will recognize blocks 600 through 612 as describing the steps involved in typical ATM/POS card processing. The same general process occurs whether the card is used in an ATM terminal or over the phone in catalog ordering or at an online website. In a step 614, the terminal's request for a withdrawal or purchase is routed over the ATM/POS financial network to the partner bank's computer system. A process 616 then uses financial transaction processing interface 360 to issue a request to the unit-minute system 340 or associated UMACH network 370 for an equivalent of unit-minutes to be transferred to the bank to compensate for the money to be redeemed. Within unit-minute system 340 or associated UMACH network 370, a decision 618 then examines the subscriber's current unit-minute balance to determine if the request can be approved. If the subscriber's unit-minute balance is insufficient, a process 620 sends an insufficient funds message back to the bank, and at a step 622, the terminals report to the subscriber that their request was denied.

If decision 618 determines that the subscriber's prepaid unit-minute balance is sufficient, a process 624 calculates any transaction fees, using transaction fee tables stored in block 374. Next, a process 626 transfers the number of unit-minutes equivalent to requested withdrawal bank plus any transaction fees. A decision 628 determines if the transaction was successfully completed. If decision 628 determines that the transaction was unsuccessful, a process 630 undoes all effects of the attempt. Then, a process 632 sends a transaction error message back to the terminal via financial network interface 360, where it is reported to the subscriber at step 622. If decision 628 determines that the transaction was successful, a process 634 sends a message back to the bank indicating that the unit-minute transfer has been completed. A process 636 then stores the transaction for later settlement. Bank computer system 361 then sends a message approving the withdrawal or purchase to the ATM/POS terminal. In a process 640, the terminal receives the approval message, remits the subscriber's money and prints any necessary receipts.

Figure 7A:
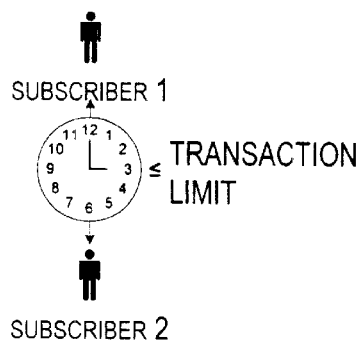
FIG. 7A is a diagram illustrating the transaction limit enforcement aspect of fraud detection in accordance with the present invention.
Figure 7B:
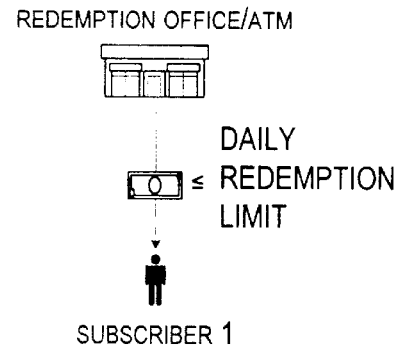
FIG. 7B is a diagram illustrating the daily unit-minute redeeming limit enforcement aspect of fraud detection in accordance with the present invention.
Figure 7C:
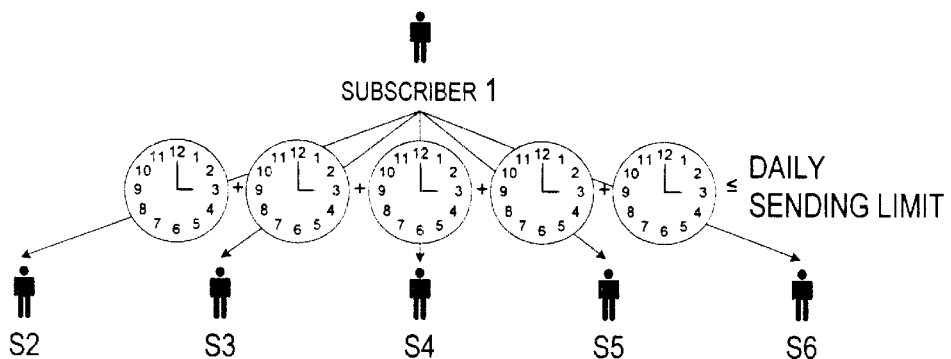
FIG. 7C is a diagram illustrating the daily unit-minute sending limit enforcement aspect of fraud detection in accordance with the present invention.
Figure 7D:
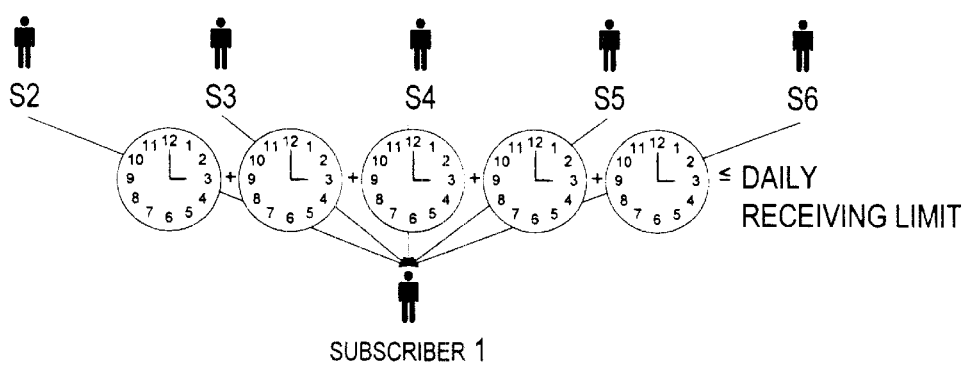
FIG. 7D is a diagram illustrating the daily unit-minute receiving limit enforcement aspect of fraud detection in accordance with the present invention.

Given the ability to transfer and redeem unit-minutes, the system and method of present invention could be used for illegal purposes, such as money laundering. To prevent and/or limit such illegal use, the system may enforce a number of criminal use prevention measures. Three such methods are illustrated in FIGS. 7A, 7B, 7C and 7D. In FIG. 7A, the transaction limit is illustrated. The transaction limit is the maximum number of unit-minutes or monetary equivalent that can be sent, received or redeemed in a single transaction. As illustrated in FIG. 7B, the daily redemption limit restricts the number of unit-minutes that can be redeemed, in any fashion, in a single day. The daily sending limit, illustrated in FIG. 7C, restricts the number of unit-minutes that can be sent from a single subscriber account in a single day. The daily receiving limit, illustrated in FIG. 7D, restricts the number of unit-minutes that can be received from a single subscriber account in a single day. Similar limits that span longer time periods may be used as well. In addition, statistical analysis of subscriber transactions may be used to detect suspicious patterns of use.

It will be appreciated that security and fraud protection are very important in any system that is associated with manipulating stored value. In particular, the unit-minute system's ability to transfer valuable telecommunication-time and then permit redemption of such time into cash, goods and services, warrants significant attention to such matters. With respect to security, the system may require subscribers to authenticate themselves with subscriber identifiers and PIN numbers. In addition, transactions are protected by system generated transaction identifiers and redemptions are protected by additional redemption passwords. Additional fraud detection is performed by analyzing login attempts for anomalous behavior such as repetitive failed authentication attempts. Communication interfaces 336 and 360 as well as all communications performed between members of UMACH network 370 may be protected by standard physical security measures and encryption techniques.

It will be further appreciated that the embodiment of present invention described herein has focused primarily on a server-based design in order to provide access to server-based stored value systems, such as prior-art prepaid telecommunication systems. However, it will be easily appreciated that Smart Card technology provides a means for storing value directly and only within a card or associated device such as wireless telephone or PDA. Therefore, the system may incorporate a Smart Card "adapter" and use associated Smart Card communication protocols to provide access by subscribers, the unit-minute system and associated UMACH network to the stored value within the Smart Card or associated device thereby allowing said stored value to be purchased, transferred and redeemed in the same manner as described herein.

It will thus be seen that the objects set forth above, among those made apparent from the preceding description, and are efficiently attained and, since certain changes may be made in carrying out the above methods and in the systems and set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall there-between.

What is claimed is:

1. A method for transferring the value associated with a pre-purchased amount of telecommunication time for redemption and uses other than making telephone calls, comprising the steps of:

providing a computer system including a prepaid platform adapter for interfacing with a prepaid platform and a financial network adapter for interfacing with a financial network;

providing unit minutes having a value associated with a purchased amount of telecommunication-time and convertible to telecommunication-time equivalents for uses other than making telephone calls;

providing a database including account information associated with a subscriber and transaction processing protocol information associated with each of said prepaid platform adapter and said financial network adapter in communication with said computer system, said account information including a unique identification and an accumulated value of said unit minutes;

providing a remote input server in communication with said computer system;

providing a subscriber input device controlled by said subscriber to access said remote input server;

accessing said computer system by said subscriber input device;

inputting information associated with a destination account for transfer of said unit minutes;

designating an amount of said unit minutes to be transferred to said destination account;

prompting said subscriber to re-designate said amount of said unit minutes to be transferred if said designated amount of unit minutes is one of less than a pre-selected minimum transfer amount and greater than a pre-selected maximum transfer amount;

determining if transfer of said unit minutes to said destination account crosses a currency boundary;

if transfer of said unit minutes to said destination account crosses a currency boundary, calculating a first value of said unit minutes to be transferred in a first currency associated with said subscriber, calculating an equivalent second value of said first value in a second currency associated with said destination account, calculating said unit minutes associated with said second equivalent value, and debiting said unit minutes associated with said equivalent value from an account of said subscriber and crediting said equivalent value associated with said subscriber's account to said destination account; and if transfer of said unit minutes to said destination account does not cross a currency boundary, debiting said unit minutes from said subscriber's account and crediting said unit minutes to said destination account.

2. The method of claim 1, wherein said step of accessing comprises accessing a device operably associatable with at least one of a telecommunication switching network, a digital communication network and a financial service network.

3. The method of claim 2, wherein said device comprises one of a telephone, a debit card, an ATM card and a credit card.

4. The method of claim 1, wherein said step of accessing comprises accessing a telephone operably associatable with a telecommunication switching network, said telephone usable for accessing said value associated with a purchased amount of telecommunication-time.

5. The method of claim 1, wherein said unit minutes are traded among brokers.

6. A system for transferring the value associated with a pre-purchased amount of telecommunication time for redemption and uses other than making telephone calls, comprising:

a computer system including a prepaid platform adapter for interfacing with a prepaid platform and a financial network adapter for interfacing with a financial network;

unit minutes having a value associated with a purchased amount of telecommunication-time and convertible to telecommunication-time equivalents for uses other than making telephone calls;

a database including account information associated with a subscriber and transaction processing protocol information associated with each of said prepaid platform adapter and said financial network adapter in communication with said computer system, said account information including a unique identification and an accumulated value of said unit minutes;

a remote input server in communication with said computer system;

a subscriber input device controlled by said subscriber to access said remote input server;

means for accessing said computer system by said subscriber input device;

input means for inputting information associated with a destination account for transfer of said unit minutes;

means for designating an amount of said unit minutes to be transferred to said destination account;

means for prompting said subscriber to re-designate said amount of said unit minutes to be transferred if said designated amount of unit minutes is one of less than a pre-selected minimum transfer amount and greater than a pre-selected maximum transfer amount;

means for determining if transfer of said unit minutes to said destination account crosses a currency boundary;

means for (i) calculating a first value of said unit minutes to be transferred in a first currency associated with said subscriber, (ii) calculating an equivalent second value of said first value in a second currency associated with said destination account, (iii) calculating said unit minutes associated with said second equivalent value, and (iv) debiting said unit minutes associated with said equivalent value from an account of said subscriber and crediting said equivalent Value associated with said subscriber's account to said destination account, if transfer of said unit minutes to said destination account crosses a currency boundary; and means for debiting said unit minutes from said subscriber's account and crediting said unit minutes to said destination account if transfer of said unit minutes to said destination account does not cross a currency boundary.

7. The system of claim 6, wherein said subscriber access is performed through a device operably associatable with at least one of a telecommunication switching network, a digital communication network and a financial service network.

8. The system of claim 7, wherein said device comprises one of a telephone, a debit card, an ATM card and a credit card.

9. The system of claim 6, wherein said subscriber access is performed through a telephone operably associatable with a telecommunication switching network, said telephone usable for accessing said value associated with a purchased amount of telecommunication-time.

10. The system of claim 6, wherein said unit minutes are traded among brokers.

11. A method for redeeming value associated with a pre-purchased amount of telecommunication time, comprising the steps of:

providing a computer system including a prepaid platform adapter for interfacing with a prepaid platform and a financial network adapter for interfacing with a financial network;

providing unit minutes having a value associated with a purchased amount of telecommunication-time and convertible to telecommunication-time equivalents for uses other than making telephone calls;

providing a database including account information associated with a subscriber and transaction processing protocol information associated with each of said prepaid platform adapter and said financial network adapter in communication with said computer system, said account information including a unique identification and an accumulated value of said unit minutes;

providing a remote input server in communication with said computer system;

providing a subscriber input device controlled by said subscriber to access said remote input server;

accessing said computer system by said subscriber input device;

inputting information associated with a redemption account for transfer of said unit minutes;

assigning a redemption password associated with said redemption account, and a transaction ID;

designating an amount of said unit minutes to be transferred to said redemption account;

prompting said subscriber to re-designate an amount of said unit minutes to be transferred to said redemption account if said designated amount of unit minutes is one of less than a pre-selected minimum amount and greater than a pre-selected maximum amount;

transferring said unit minutes to said redemption account;

submitting said transaction ID and said redemption password;

verifying said transaction ID and said redemption password; and if said transaction ID and said redemption password are valid, debiting said unit minutes from said redemption account and transferring a monetary value associated with said unit minutes to a redeemer.

12. The method of claim 11, wherein said step of accessing comprises accessing a device operably associatable with at least one of a telecommunication switching network, a digital communication network and a financial service network.

13. The method of claim 12, wherein said device comprises one of a telephone, a debit card, an ATM card and a credit card.

14. The method of claim 11, wherein said subscriber access is performed through a telephone operably associatable with a telecommunication switching network, said telephone usable for accessing said value associated with a purchased amount of telecommunication-time.

15. The method of claim 11, wherein said unit minutes are traded among brokers.

16. A system for redeeming value associated with a pre-purchased amount of telecommunication time, comprising:

- a computer system including a prepaid platform adapter for interfacing with a prepaid platform and a financial network adapter for interfacing with a financial network;
- unit minutes having a value associated with a purchased amount of telecommunication-time and convertible to telecommunication-time equivalents for uses other than making telephone calls;
- a database including account information associated with a subscriber and transaction processing protocol information associated with each of said prepaid platform adapter and said financial network adapter in communication with said computer system, said account information including a unique identification and an accumulated value of said unit minutes;
- a remote input server in communication with said computer system;
- a subscriber input device controlled by said subscriber to access said remote input server;
- means for accessing said computer system by said subscriber input device;
- input means for inputting information associated with a redemption account for transfer of said unit minutes;
- means for assigning a redemption password associated with said redemption account, and a transaction ID;
- means for designating an amount of said unit minutes to be transferred to said redemption account;
- means for prompting said subscriber to redesignate an amount of said unit minutes to be transferred to said redemption account if said designated amount of unit minutes is one of less than a pre-selected minimum amount and greater than a pre-selected maximum amount;
- means for transferring said unit minutes to said redemption account;
- means for submitting said transaction ID and said redemption password;
- means for verifying said transaction ID and said redemption password; and
- means for debiting said unit minutes from said redemption account and transferring a monetary value associated with said unit minutes to a redeemer if said transaction ID and said redemption password are valid.

17. The system of claim 16, wherein said subscriber access is performed through a device operably associatable with at least one of a telecommunication switching network, a digital communication network and a financial service network.

18. The system of claim 17, wherein said device comprises one of a telephone, a debit card, an ATM card and a credit card.

19. The system of claim 16, wherein said subscriber access is performed through a telephone operably associatable with a telecommunication switching network, said telephone usable for accessing said value associated with a purchased amount of telecommunication-time.

20. The system of claim 16, wherein said unit minutes are traded among brokers.

21. A method for redeeming value associated with a pre-purchased amount of telecommunication time, comprising the steps of:

- providing a computer system including a prepaid platform adapter for interfacing with a prepaid platform and a financial network adapter for interfacing with a financial network;
- providing unit minutes having a value associated with a purchased amount of telecommunication-time and convertible to telecommunication-time equivalents for uses other than making telephone calls;
- providing a database including account information associated with a subscriber and transaction processing protocol information associated with each of said prepaid platform adapter and said financial network adapter in communication with said computer system, said account information including a unique identification and an accumulated value of said unit minutes;
- providing a remote input server in communication with said computer system;
- providing a subscriber input device controlled by said subscriber to access said remote input server;
- accessing said computer system by said subscriber input device;
- requesting withdrawal of a monetary equivalent of at least a portion of said accumulated value of unit minutes using said subscriber input device;
- routing said request for withdrawal to a financial institution associated with said financial network via said financial network;
- issuing said request to said computer system;
- determining if said account information associated with said subscriber indicates an amount of said unit minutes sufficient to satisfy said request for withdrawal;
- if said account information associated with said subscriber indicates an insufficient amount of said unit minutes to satisfy said request for withdrawal, communicating an insufficient funds message to said financial institution and terminating the transaction;
- if said account information associated with said subscriber indicates a sufficient amount of said unit minutes to satisfy said request for withdrawal, transferring said requested equivalent of said accumulated value of unit minutes to said financial institution, approving said transaction, and storing the transaction for subsequent settlement.

22. The method of claim 21, wherein said subscriber input device is one of an ATM card, a debit card and a credit card.

23. The method of claim 21, wherein said step of accessing comprises accessing a device operably associatable with at least one of a telecommunication switching network, a digital communication network and a financial service network.

24. The method of claim 21, wherein said subscriber access is performed through a telephone operably associatable with a telecommunication switching network, said telephone usable for accessing said value associated with a purchased amount of telecommunication-time.

25. The method of claim 21, wherein said unit minutes are traded among brokers.

26. A system for redeeming value associated with a pre-purchased amount of telecommunication time, comprising:

a computer system including a prepaid platform adapter for interfacing with a prepaid platform and a financial network adapter for interfacing with a financial network;

unit minutes having a value associated with a purchased amount of telecommunication-time and convertible to telecommunication-time equivalents for uses other than making telephone calls;

a database including account information associated with a subscriber and transaction processing protocol information associated with each of said prepaid platform adapter and said financial network adapter in communication with said computer system, said account information including a unique identification and an accumulated value of said unit minutes;

a remote input server in communication with said computer system;

a subscriber input device controlled by said subscriber to access said remote input server;

wherein a request made via said subscriber input device for withdrawal of a monetary equivalent of at least a portion of said accumulated value of unit minutes is routed to a financial institution associated with said financial network via said financial network, said request is issued to said computer system, and said requested equivalent of said accumulated value of unit minutes is transferred to said financial institution and the transaction is stored for subsequent settlement if said account information associated with said subscriber indicates a sufficient amount of said unit minutes to satisfy said request for withdrawal.

27. The system of claim 11, wherein said subscriber input device is one of an ATM card, a debit card and a credit card.

28. The system of claim 26, wherein said subscriber access is performed through a device operably associatable with at least one of a telecommunication switching network, a digital communication network and a financial service network.

29. The system of claim 26, wherein said subscriber access is performed through a telephone operably associatable with a telecommunication switching network, said telephone usable for accessing said value associated with a purchased amount of telecommunication-time.

30. The system of claim 26, wherein said unit minutes are traded among brokers.

* * * * *